United States Patent [19]

Murai et al.

[11] Patent Number: 5,051,998
[45] Date of Patent: Sep. 24, 1991

[54] DATA BLOCK DEINTERLEAVING AND ERROR CORRECTION SYSTEM

[75] Inventors: Katsumi Murai, Osaka; Yuzuru Kuroki, Sapporo; Isao Satoh, Osaka, all of Japan

[73] Assignee: Matsushita Electric Industrial Co., Ltd., Japan

[21] Appl. No.: 372,585

[22] Filed: Jun. 28, 1989

[30] Foreign Application Priority Data

Jun. 28, 1988 [JP] Japan .................. 63-160083

[51] Int. Cl.$^5$ .................................. G06F 11/10
[52] U.S. Cl. .................................. 371/39.1; 371/5.4; 371/40.1; 371/47.1; 371/65
[58] Field of Search ............ 371/39.1, 38.1, 40.3, 371/40.1, 42, 47.1, 65, 37.5, 37.8, 2.1, 2.2, 5.1, 5.3, 5.4

[56] References Cited

U.S. PATENT DOCUMENTS 4,059,825 11/1977 Greene .................. 371/39.1
4,835,772 5/1989 Peile .................. 371/39.1
4,858,235 8/1989 Matsuda .................. 371/40.1 X
4,916,702 4/1990 Berlekamp .................. 371/39.1

FOREIGN PATENT DOCUMENTS 59-185035 10/1984 Japan .

Primary Examiner—Robert W. Beausoliel
Attorney, Agent, or Firm—Lowe, Price, LeBlanc & Becker

[57] ABSTRACT

A deinterleaving and error correction system which is advantageously utilized in a playback system of an optical recording disk apparatus. As each block of sector data, encoded for example with the Reed-Solomon error correction code with block interleaving, is read from the disk, the positions within the data block at which drop-out of the playback signal occurs are respectively stored in a memory in which the data symbols are also stored, with these drop-out positions being stored as error position data. Error correction processing is executed using the error position data in conjunction with the code words, enabling the maximum number of correctable errors for each sector to be substantially increased using a simple system configuration.

9 Claims, 15 Drawing Sheets

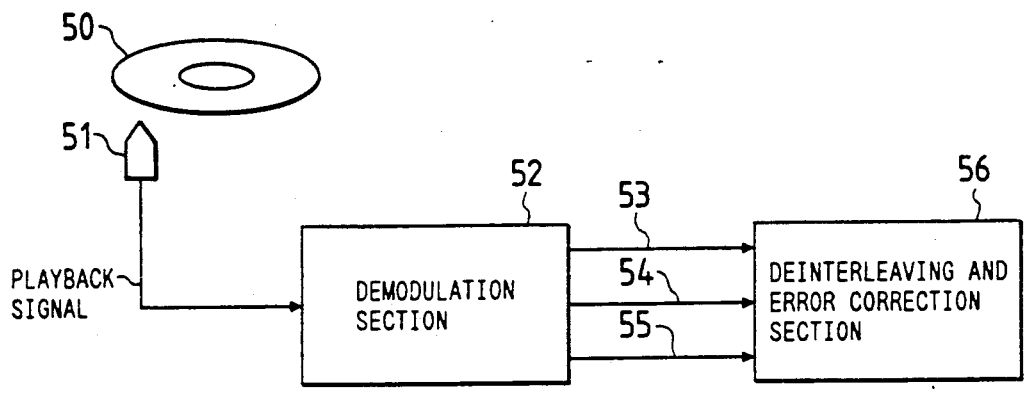
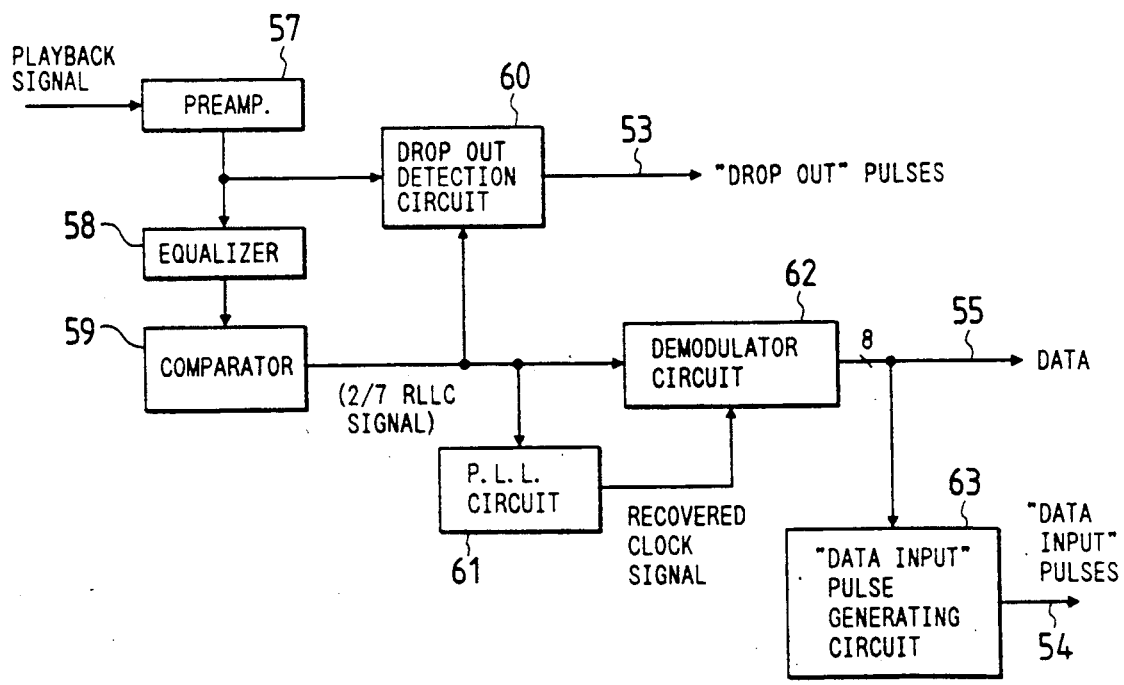

FIG. 11

| | | | | | | | | |
|---|---|---|---|---|---|---|---|---|
| 0000H | $D_0$ | $D_1$ | $D_2$ | $D_3$ | $D_4$ | $D_5$ | $D_6$ | $D_7$ |
| | $D_8$ | $D_9$ | $D_{10}$ | $D_{11}$ | $D_{12}$ | $D_{13}$ | $D_{14}$ | $D_{15}$ |
| | $P_{13}$ | $P_{29}$ | | | | | | |
| | $P_{14}$ | $P_{30}$ | | | | | | $P_{126}$ |
| | $P_{15}$ | $P_{31}$ | | | | | | $P_{127}$ |
| | $S_{0,0}$ | $S_{1,0}$ | $S_{2,0}$ | | | | $S_{6,0}$ | $S_{7,0}$ |
| | $S_{0,15}$ | $S_{1,15}$ | $S_{2,15}$ | | | | $S_{6,15}$ | $S_{7,16}$ |
| | $PT_0$ | $PT_1$ | $PT_2$ | | | | $PT_6$ | $PT_7$ |
| | $X_{0,0}$ | $X_{1,0}$ | $X_{2,0}$ | | | | $X_{6,0}$ | $X_{7,0}$ |
| | $X_{0,1}$ | $X_{1,1}$ | | | | | | |
| | | | | | | | | |
| | | | | | | | | |
| 0800H | $D_0$ | $D_1$ | $D_2$ | $D_3$ | $D_4$ | $D_5$ | $D_6$ | $D_7$ |
| | $D_8$ | $D_9$ | $D_{10}$ | $D_{11}$ | $D_{12}$ | $D_{13}$ | $D_{14}$ | $D_{15}$ |
| F800H | $D_0$ | $D_1$ | | | | | | |
| | | | | | | | | FFFFH |

DATA BLOCK DEINTERLEAVING AND ERROR CORRECTION SYSTEM

BACKGROUND OF THE INVENTION

1. Field of the Invention

The present invention relates to an improved system for deinterleaving and error correction of blocks of data each consisting of symbols which are successively interleaved in an error correction code symbol array. In particular, the invention relates to a system whereby the maximum number of errors that can be detected in a data block can be increased over the prior art, with a simple circuit arrangement.

2. Prior Art Technology

To permit partial writing or erasure of an optical recording disk, guide tracks are provided on the disk. These guide tracks are detected optically, and are formed concentrically or in a spiral configuration. In addition, each recording track of the disk is divided into a plurality of sectors, each having a data block recorded therein, with data recording and playback being executed in units of these sectors. Each sector includes a sector ID (i.e. identifier) portion which contains track address and sector address information, and a data field in which is recorded the message data. Parity data are added to the message data contained in the data field, for use in error detection and correction. In addition, immediately before the message data that are recorded in the data field, a sync pull-in signal portion is usually inserted, for use in achieving pull-in of a PLL (phase locked loop) that is utilized at the time of playback in recovering the clock signal component of the recorded data. A data mark is also inserted before the data field, for indicating the leading portion of the message data. In addition, resynchronizing signal portions are inserted at periodic intervals, for use in holding recovered clock signal produced from the PLL of the playback system locked in frequency and phase with the clock signal component of the recorded data. It is now common practice to also encode the data prior to recording, using some form of error correction code which permits correction during playback of errors which occur in the playback signal. Usually, a Reed-Solomon error correction code with block interleaving is utilized, whereby prior to recording, all of the symbols (i.e. bytes) of data to be recorded in one sector are arranged in a memory in a rectangular array of memory addresses, and parity data are derived for each of a plurality of sets of bytes of the data and added to these sets of bytes to form a set of code words, with the bytes of these code words being mutually interleaved with respect to the sequence in which the bytes are recorded. At the time of playback, a reverse process, i.e. deinterleaving is executed, and the parity data are utilized to detect whether errors are contained in the playback signal (i.e. by deriving an error syndrome from the code words in the playback data), and any errors are corrected. FIG. 9 shows an example of such an interleaved data configuration for one sector, with added parity information, prior to recording the data. In FIG. 9, numeral 1 denotes the message data, which consists of 1024 data symbols designated as D0 to D1023 respectively (each symbol consisting of one 8-bit byte). Numeral 2 denotes control data and a CRCC (cyclic redundancy check code) consisting of a total of 16 symbols designated as C0 to C15 respectively. C0 to C11 are the control data, and C12 to C15 are the CRCC. Numeral 3 denotes a set of parity symbols P0 to P127, which are utilized at the time of playback for error detection and correction, for computations based on an error correction code generating polynomial that was utilized in generating the parity data prior to recording, as described above.

Before the successive bits of the data obtained by the encoding process described above are recorded on an optical recording disk, they are usually modulated to be converted to 2-7 RLL (run length limited) code.

In FIG. 9, numeral 4 denotes respective resynchronizing signal portions, which are used during playback for synchronizing the recovered clock signal as mentioned above. Prior to recording, each of these resynchronizing portions 4 is converted into a 1-byte bit sequence which violates the of 2-7 RLL code standards, and so can be detected in the playback signal at the time of playback. Numeral 5 denotes the data mark, which also consists of a bit sequence which violates the 2-7 RLL code standards. Numeral 6 denotes the PLL pull-in signal portion, which is used during playback for pull-in of a PLL that generates a recovered clock signal, for use in demodulation, i.e. conversion of the playback signal from 2-7 RLLC form to normal binary code.

With the format of FIG. 9, 4 bytes of CRCC are added to the 1024 bytes of message data and 12 bytes of control data. The message data, CRCC and control data are arranged as shown prior to recording (in a memory) as a rectangular array consisting of 8 rows, each row containing a total of 130 symbols. To this is added, as shown, 8 rows of parity data, each row containing 16 bytes. Each row of the complete array (e.g. the row from D0 to P15) constitutes one code word, so that there are 8 code words (designated as code words 0 to 7 in FIG. 9) per sector in this example. A resynchronizing signal portion RS is inserted once in every 16 bytes of the interleaved recording signal, with each such set of 16 bytes constituting one frame. The data are recorded as successive columns of the array shown in FIG. 9, in the direction indicated by the arrow. That is, first the sync pull-in signal portion 6 is recorded, then the data mark 5 and so on until symbol D7 of the first column, then the next column from top to bottom, and so on. In this way, one-dimensional interleaving of the code word symbols of a sector is executed at the time of recording. Upon playback, such sector data obtained from the playback signal are deinterleaved by being arranged (i.e. in an array of addresses of a memory) in the array format shown in FIG. 9, and error correction is executed based on the contents of each code word.

FIG. 10 shows the format of a bi-level serial playback signal corresponding to one sector, obtained by playback of data which have been recorded with a format of the form in FIG. 9. As shown, the signal format consists of the sector identifier (ID) 8, then the PLL pull-in signal portion (indicated as SYNC) 6, which is followed by the data mark (DM) signal portion 5 (indicating that the leading byte of the message data will immediately follow), then a first portion of the playback data, referred to in the following as a frame (i.e. corresponding to symbols D0 to D7 in FIG. 10, then a resynchronizing signal portion 4, and so. The resynchronizing signal portions 4 thereby occur at fixed intervals in the playback signal, for use in periodically synchronizing the PLL clock recovery circuit of the playback system. The successive frames are designated as F1, F2 and so on.

During recording or playback of an optical recording disk, the sector identifiers 8 of successive sectors are read and compared with a target value of sector identifier, and recording or playback then executed when the target sector is reached. During playback, the level of the playback signal will occasionally drop (i.e. drop-out occurs) due to various factors such as disk surface defects, etc. In the playback system, an envelope detector circuit functions to detect when such drop-out has occurred, and to produce a pulse or a succession of pulses for the duration of the drop-out interval. When a brief-duration drop-out occurs, then one or more symbol errors corresponding to the drop-out interval will occur in the playback signal. If a long-duration drop-out occurs in the playback signal, then the recovered clock signal of the playback system will be disturbed, which may cause an error propogatin phenomenon called "bit slip", whereby all of the symbols within a frame following the portion in which the clock signal is disturbed will be in error. Such a bit slip error condition is indicated by numeral 10. Drop-out can result from various causes, e.g. defects in the optical recording disk material, in the recording film or the protective layers on the disk, dust or scratches on the disk, etc. Since the physical length of one bit as recorded on an optical recording disk track is very short (approx 1 $\mu$m), the basic error rate is very poor, e.g. $10^{-5}$ to $10^{-6}$, and long-duration drop-out will frequently occur. There is thus a high probability that irrecoverable errors will result from such long-duration drop-out occurrences. With bit slip, the number of errors which occur within one frame of the playback signal (i.e. between two successive RS signal portions) is large enough to affect the frequency of the PLL circuit which generates the recovered clock signal, causing errors in the operation of the demodulation circuit which converts the playback signal from the recording signal type (e.g. 2-7 RLLC) to normal binary code. As a result, all of the bytes in such a frame, from the point at which bit slip begins, will be in error. Since the recovered clock signal is synchronized by each RS signal portion, and since the end of each RS signal portion of course defines the position of the first bit of the first byte in the succeeding frame, the effects of bit slip are limited to units of frames.

The bit slip phenomenon is illustrated in FIG. 10. In this example, a single error byte or short-duration error burst occurs during a first frame F1 of a block of playback data of a sector. This results in a corresponding number of error bytes in that frame, as indicated by numeral 9. However a long-duration data error burst 10, shown as occurring in the succeeding frame, F2, may result in a momentary disturbance of the recovered clock signal, causing bit slip to occur, so that all of the demodulated data obtained for the remaining portion of frame F3 are in error.

Such bit slip errors present a basic problem for optical recording disk recording. Firstly, error correction of playback data by means of an error correction code scheme can only achieve reliable correction of a certain maximum number of errors in each data block. This maximum number of correctable errors can be increased by increasing the number of parity bytes that are added to the data before recording, however there are practical limitations on the size of the parity data. With magnetic recording systems, long-duration error bursts in the playback signal are relatively uncommon, and so bit slip will be correspondingly infrequent, so reliable error correction can be achieved. However in the case of optical recording disk recording, due to the small physical size of each data bit as represented on the recording surface, even small particles of dust on the disk surface, for example, can result in long error bursts in the playback signal. Thus, bit slip can occur a number of times within the playback data obtained for one sector, which can cause the number of error bytes in that data to exceed the number that can be reliably corrected based on the parity data. Irrecoverable errors can thereby remain after error correction processing of data of a sector has been completed.

SUMMARY OF THE INVENTION

It is an objective of the present invention to overcome the problems of the prior art described above, by providing a deinterleaving and error correction system which can achieve more effective error correction of data containing long bursts of errors, using an error correction code, than has been possible in the prior art.

According to one aspect of the invention, an error correction and deinterleaving system is provided whereby the total number of errors that can be corrected in a block of data supplied to the system is increased, by comparison with the prior art. This is achieved by storing in a memory the bytes of a data block obtained from a playback signal, arrayed as required for error detection and error correction computation, and also storing the respective positions within that array of those bytes which have been detected as coinciding with a drop-out condition of the playback signal, and which are therefore judged to have been lost. As a result, for a given number of parity bytes being utilized in each data block (i.e. for a given Hamming distance of the error correction code that is used), the maximum number of error bytes which can be corrected is increased over a prior art apparatus in which such storing of error position data is not executed. The above problem of large numbers of errors in the playback data occurring, due to bit slip, can thereby be alleviated.

According to another aspect of the invention, the possible occurrence of bit slip, beginning at some point within a frame of the playback data is detected, based on a total number of occurrences of drop-out during the frame. The remainder of the symbols (i.e. bytes) of that frame, from the point at which drop-out was detected, are then assumed to be in error as a result of bit slip, and the positions of these symbols in the data block are stored in a memory, for use in error correction computations. However during each frame, a check is made as to whether the recovered clock signal used for demodulation of the playback signal was actually disturbed within the frame, due to bit slip. If it is found at the end of the frame that bit slip actually did not occur, then the stored bit slip error position data for that frame are discarded.

According to another aspect of the invention, if it is detected during a frame that bit slip has commenced at a certain point during the frame, then all of the data extending from that point to the end of the frame are re-modulated to be converted into the data form used for recording (e.g. converted back to 2-7 RLLC form), and the resultant bits are shifted by one bit position or more, in the opposite direction to a shift which resulted from the bit slip. The resultant signal is then again demodulated, and inserted back as corrected data into the frame in question, which is held stored in a memory. In this way, even if very large numbers of error symbols occur in the playback data as a result of bit slip, these can be substantially entirely corrected, even if the total number of error symbols in the playback data greatly exceeds the maximum correction capability of the error correction code scheme that is utilized.

More specifically, a first embodiment of the invention comprises, in an apparatus for recovering data symbols from an input data signal, including demodulation means for demodulating the input data signal to obtain the data symbols, a system for deinterleaving and error correction of data symbols of a block of data formed as a plurality of interleaved error correction code words, the system comprising:

memory means;

means for storing sets of the symbols produced from the demodulation means as respective code words in an array of addresses of the memory means corresponding to a predetermined error correction code array format;

means for detecting a signal quality deterioration condition of the input data signal which indicates occurrence of a symbol error;

means for counting numbers of the error symbols occurring in respective ones of the code words, to obtain respective error symbol count values;

means for storing in the memory means at addresses determined by the error symbol count values, as error position data, respective addresses in the memory means of error symbols which coincide with detection of the signal quality deterioration condition;

means functioning after a final one of the fixed number of data symbols has been obtained from the demodulation means, for writing final ones of the error symbol count values into predetermined addresses of the memory means; and error correction means functioning after the final error symbol count values have been written in the memory means for operating on the data symbols, error position data, and error symbol count values, to execute error correction processing.

Another embodiment of the invention comprises, in an apparatus for recovering data symbols from an input data signal, including demodulation means for demodulating the input data signal to obtain the data symbols, a system for deinterleaving and error correction of data symbols of a block of data formed as a plurality of interleaved error correction code words, the system comprising:

memory means;

means for storing sets of the symbols produced from the demodulation means as respective code words in an array of addresses of the memory means corresponding to a predetermined error correction code array format;

means for detecting a signal quality deterioration condition of the input data signal which indicates occurrence of an error symbol;

means for counting respective total numbers of the error symbols, to obtain error symbol count values for respective ones of the code words;

means for generating numeric values representing successive Galois field elements, in response to successive ones of the symbols obtained from the demodulation means;

means for storing in the memory means at addresses determined by the error symbol count values, as error position data, respective ones of the Galois field elements which are generated in coincidence with detection of the signal quality deterioration condition;

means functioning after a final one of the fixed number of data symbols has been supplied, for writing final ones of the error symbol count values into predetermined addresses of the memory means; and error correction means functioning after the final error symbol count values have been written in the memory means for operating on the data symbols, error position data, and error symbol count values, to execute error correction processing.

Another embodiment of the invention comprises, in an apparatus for recovering data symbols from an input data signal, including means for deriving a recovered clock signal from the input data signal and demodulation means utilizing the recovered clock signal for demodulating the input data signal to obtain the data symbols, a system for deinterleaving and error correction of data symbols of a block of data formed as a plurality of interleaved error correction code words, the block being divided into a plurality of successive frames each comprising an identical number of data symbols, each of the frames being preceded by a fixed-duration resynchronizing signal, the system comprising:

memory means;

detection means responsive to each of the resynchronizing signals for generating a corresponding resynchronizing detection signal;

means for storing sets of the symbols produced from the demodulation means as respective code words in an array of addresses of the memory means corresponding to a predetermined error correction code array format;

means for detecting a signal quality deterioration condition of the input data signal which indicates occurrence of a symbol error and for producing a drop-out pulse in synchronism with each of the data symbols which coincides with the condition;

reversible counter mean for counting successive ones of the drop-out pulses to produce respective error symbol count values corresponding to the code words;

means responsive to generation of a predetermined number of the drop-out pulses during an $n^{th}$ one of the frames for generating a signal indicating that a bit slip condition has possibly occurred within the $n^{th}$ frame, at a specific position within the frame, and for designating all symbols of the $n^{th}$ frame which are obtained subsequent to the specific position as being error symbols;

means for storing in the memory mean at addresses determined by the error symbol count values, as error position data, respective addresses in the memory means of the error symbols;

means for detecting an actual occurrence of bit slip during a frame by counting a number of periods of the recovered clock signal which occur between two resynchronization signals which respectively immediately precede and immediately succeed the frame;

means functioning, if the actual occurrence of bit slip is not detected for the $n^{th}$ frame, to execute down-counting by the reversible counter means during an $(n+1)^{th}$ frame immediately succeeding the $n^{th}$ frame, by an amount which is identical to a number of error symbols counted as having occurred due to bit slip during the $n^{th}$ frame;

means functioning after a final one of the fixed number of data symbols has been supplied, for writing final ones of the error symbol count values into predetermined addresses of the memory means; and error correction means functioning after the final error symbol count values have been written in the memory means for operating on the data symbols, error position data, and error symbol count values, to execute error correction processing.

BRIEF DESCRIPTION OF THE DRAWINGS

FIG. 1 is a general block diagram of a playback system for an optical recording disk;

FIG. 2 is a general block diagram of a demodulation section of a playback system in first and second embodiments of the present invention;

FIG. 11 is a memory map showing relationships between storage locations of various playback data from a plurality of sectors of a recording disk, stored in a buffer memory;

DESCRIPTION OF PREFERRED EMBODIMENTS

The Reed-Solomon code, with block interleaving of code words, is widely utilized as an error correction coding method for optical recording disk recording. With the Reed-Solomon code, designating the Hamming distance (i.e. the minimum number of mutually different symbols between any two code words) as d, and the number of "lost-byte error" positions in a code word of a playback signal (i.e. number of positions within the code word at which it is known that a symbol of the code word is missing) as L, then the maximum number of error symbols in a playback code word that can be corrected is $L+(d-L-1)/2$, where $L<d$. If for example a Reed-Solomon code with a Hamming distance of 17 is used, and the positions of error symbols are not known, then it is only possible to correct a maximum of 8 errors in each code word. However if it is possible to determine the respective positions of up to 16 lost-byte errors in each code word, then a maximum of 16 lost-byte errors can be corrected. Generally, one-dimensional block interleaving is used, and in that case it is only possible to find the lost-byte error positions in the playback data by detecting those time intervals in which the playback signal condition is such that a lost-byte error must have occurred. In principle, it is possible to use various conditions of the playback signal (obtained by scanning the optical recording disk) or the playback data (derived from the playback signal), for detecting when a playback lost-byte error has occurred. For example, the level of the playback signal can be monitored, and a signal indicating a drop-out condition (and therefore one or more lost-byte error positions) can be generated when the playback signal level falls below a certain value. Alternatively, based on the fact that data are generally recorded on an optical recording disk in 2-7 RLLC (Run Length Limited Code), it is possible to detect each occurrence of a condition in which a sequence of bits of the playback signal violates the 2-7 RLLC standard, and to use that condition as an indication of drop-out, and hence a lost-byte error position. Information relating to such conditions of the playback signal or playback data, which can be used to indicate lost-byte error positions, will be referred to in the following as playback quality deterioration information.

However in the prior art it has not been possible in practice to effectively utilize such signal quality information for error correction, i.e. it has not been possible to effectively transfer such information to be used by the error correction circuits. A first embodiment of the invention will be described which enables such signal quality information to be effectively used to increase the maximum number of errors that can be detected in each code word of the playback data.

Figure 9:
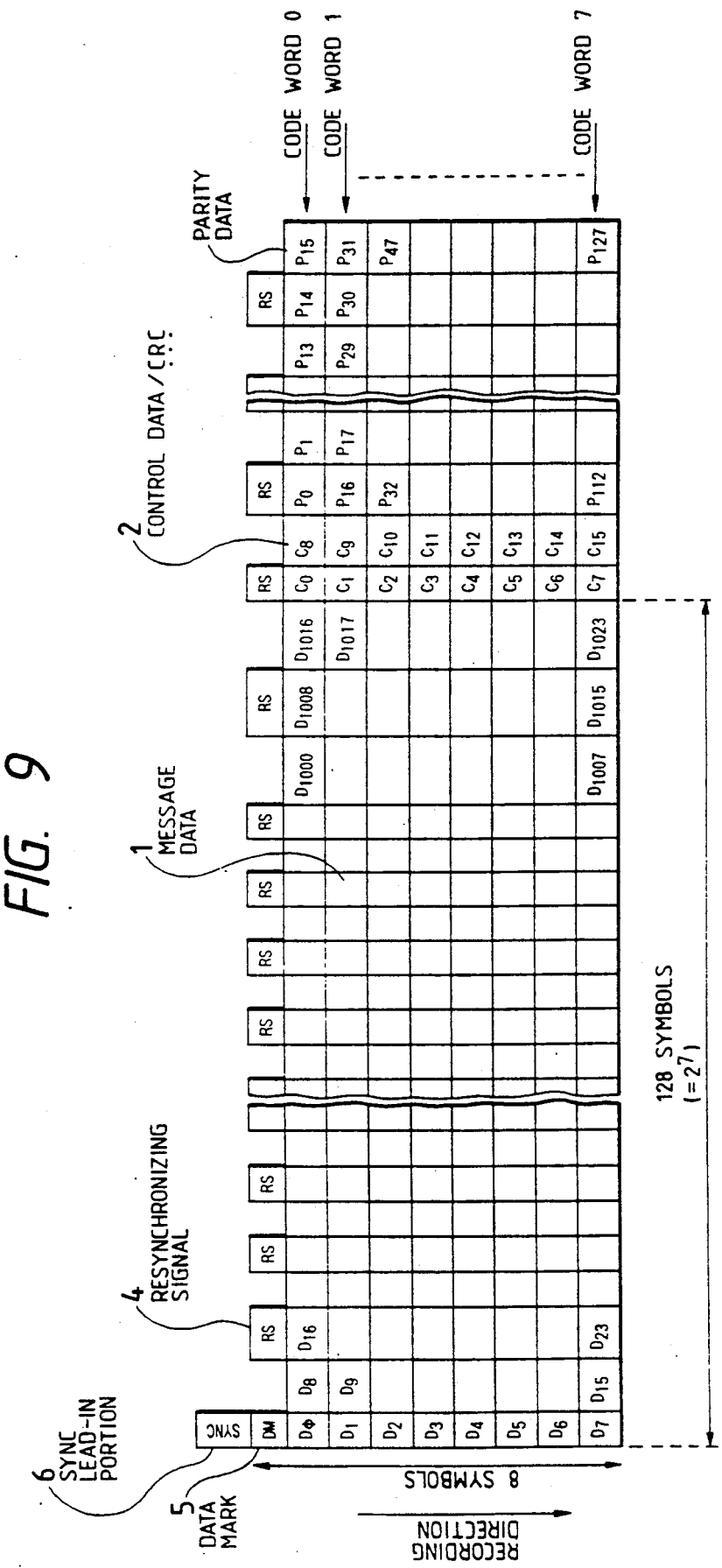
FIG. 9 shows an example of a format in which data of one sector of a recording disk track are arrayed prior to recording.

FIG. 1 is a block diagram illustrating the basic configuration of a playback system such as that of the first embodiment and the succeeding three embodiments. A playback signal, which consists of interleaved data symbols including code error correction symbols (e.g. recorded using the format of FIG. 9 as described hereinabove), converted to a 2-7 RLLC form, is obtained from an optical recording disk 50 by a sensor 51, and is transferred to a demodulation section 52. In the demodulation section 52, demodulation is executed for converting the playback signal from 2-7 RLLC form back to the binary code sequence of the original encoded data prior to recording. The demodulation section 52 also includes circuits for deriving a recovered clock signal from the playback signal, for use in demodulation, and a circuit for detecting when drop-out of the playback signal has occurred (as described hereinabove). The demodulation section 52 thereby ouputs (on an output line 55, which is actually a set of 8 parallel data lines) the successive symbols (i.e. bytes) of the playback data, and in addition outputs (on an output line 54) a DATA INPUT pulse signal, whereby one pulse is applied each time a playback data symbol is produced on line 55. The demodulation section 52 also produces (on an output line 53) a DROP-OUT pulse signal, whereby one pulse is produced each time that it has been detected that playback signal drop-out has occurred during a time interval in which a playback data symbol should occur. Each DROP-OUT pulse coincides with a corresponding DATA INPUT pulse, to indicate that the corresponding playback data symbol has been lost, i.e. to indicate that a lost-byte error has occurred. These signals produced on the output lines 53, 54 and 55 are transferred to a deinterleaving and error correction section 56, which executes deinterleaving of the playback data by storing the data in a buffer memory in the original format established prior to recording (e.g. as shown in FIG. 9), establishes the positions of the respective lost-byte errors in the playback data and the total numbers of lost-byte errors in the respective code words, and executes correction of that data based on the code words, the lost-byte error positions and the total numbers of lost-byte errors.

FIG. 2 is a general block diagram showing an example of the configuration of the deinterleaving and error correction section 56. The playback signal obtained by scanning the optical recording disk is amplified in a preamplifier 57, whose output is supplied to a drop-out detection circuit 60 and to an equalizer circuit 58. The output from the equalizer 58 is supplied to a comparator 59, to be compared with a predetermined voltage level (not shown in the drawing), to be converted to a bi-level sequence of "0" and "1" bits in 2-7 RLLC form, as converted prior to recording the data. This bi-level signal is supplied to a PLL (phase locked loop) circuit 61, which thereby derives a recovered clock signal that is synchronized with a clock signal component in the playback signal. The 2-7 RLLC signal and the recovered clock signal are supplied to a demodulator circuit 62, which executes conversion from 2-7 RLLC form to normal binary code. The demodulator 62 outputs the demodulated data as successive symbols (bytes) in 8-bit parallel form, over data lines 55. A DATA INPUT pulse generating circuit 63 produces a DATA INPUT pulse in synchronism with each byte that is produced from the demodulator 62.

The drop-out detection circuit 60 detects when drop-out of the playback signal has occurred, based on two criteria. Firstly, if the playback signal level falls below a specific level, indicating that reliable operation of the comparator 59 is no longer possible, and hence drop-out has occurred. Secondly, if a sequence of bits of the 2-7 RLLC signal from the comparator 59 is found to violate the 2-7 RLLC standards, then this is judged to indicate that drop-out has occurred. The drop-out detection circuit 60 produces one DROP OUT pulse in synchronism with each DATA INPUT pulse, for the duration of each interval in which the drop-out condition is detected.

In addition to the above, the demodulation section 52 must also detect the sector identifiers (ID) of the successive sectors, each of which precedes the SYNC lead-in portion at the start of a sector data block. The sector ID is detected from the output signal of the comparator 59, and supplied for example to a microprocessor controlling the overall playback system. However for simplicity of description, the ID detection section will be omitted from the following.

Figure 3:
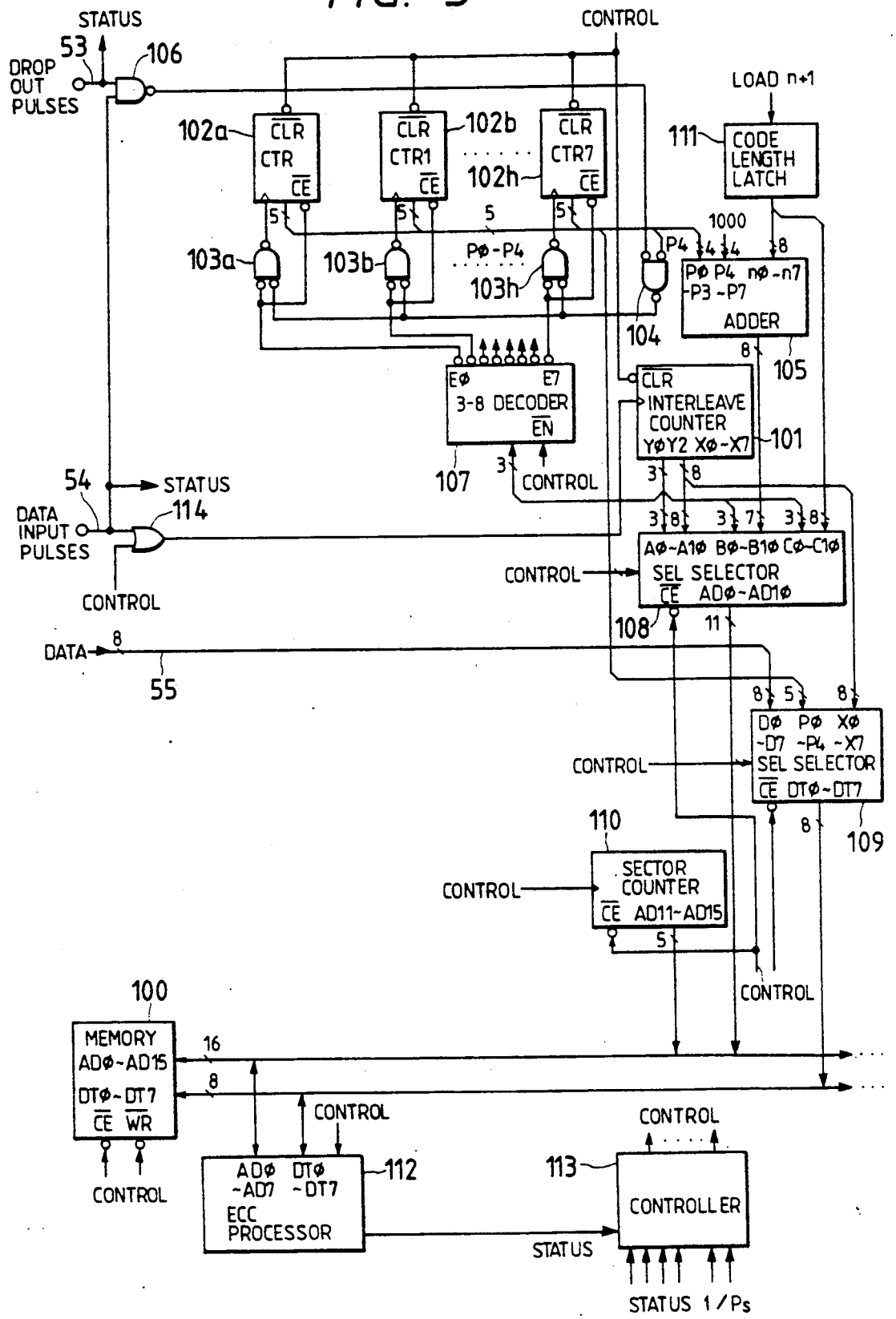
FIGS. 3 and 4 are system block diagrams of first and second embodiments of a deinterleaving and error correction system according to the present invention.

FIG. 3 is a block diagram of a deinterleaving and error correction section 56 of a first embodiment of the present invention. This embodiment provides an increase in the maximum number of errors in the data for a sector which can be corrected, i.e. whereby a maximum of 16 87 errors within each code word can be corrected, as described hereinabove. This is done by storing data representing the respective positions of lost-byte errors within the playback data. In FIG. 3, the aforementioned DROP-OUT pulse signal and the DATA INPUT pulse signal are respectively supplied from the aforementioned lines 53 and 54 respectively from the demodulation section 52. The playback data, i.e. the successive data symbols, are applied over the data lines 55. Numeral 100 denotes a buffer memory, which is a RAM (random access memory) through which all error correction and deinterleaving processing are executed. Numeral 101 denotes an 11-bit interleave counter, referred to in the following as a first counter, whose count is incremented by a DATA INPUT pulse (transferred through an OR gate 114) each time that a data symbol is inputted. The buffer memory 100 has 16 address bits, and the 11 bits of the output from the counter 101 are utilized as the lower-significance 11 address bits, while the upper-significance 5 address bits are supplied from a sector counter 110 as described hereinafter. Of the 11 bits produced from the counter 101, a set of three of these bits (Y0 to Y2) indicates the interleaving level of the data symbol that is currently being received (i.e. the number of the code word containing that symbol, the number being in the range 0 to 7 as shown in FIG. 9), while the remaining 8 bits from the counter 101 indicate the position of that symbol within the code word. In this way, for example, the symbol D9 shown in FIG. 9 can be specified as being at the second symbol position, within code word 1 (D1 to P31).

Numerals 102a, 102b, ... 102h denote a set of eight 5-bit counters, each of which is used to count a number of lost-byte errors that occurs in a corresponding one of the code words, with the outputs from the counters being applied to a set of 5 lines P0 to P4. The contents of the counters 102a, 102b, ... 102h at the end of receiving playback data for one sector thereby represent signal quality information for that sector, as respective total numbers of lost-byte errors for the code words. The counters 102a, 102b, ... 102h operate by counting DROP-OUT pulses from the input terminal 60.

Only the outputs from one of the counters 102a, 102b, ... 102h at a time are selected, with the selection being based on tri-state outputs from the counters. Specifically, when one of the counters 102a, 102b, ... 102h is selected, by a selection signal produced from a decoder circuit 107 (described hereinafter), that selection signal is applied to an OE (Output Enable) terminal of the counter.

A controller 113, which is implemented as a high-speed IC controller, performs overall control of the operation of the circuit blocks, and also control of read and write operations of the buffer memory 100, based on various STATUS inputs applied thereto which indicate conditions such as occurrence of drop-out, the operating state of the buffer memory 100, etc.

Numeral 112 denotes an error correction processor, which computes an error syndrome for each sector data block based upon all of the received data symbols of the block. If errors have been detected in the sector data block (i.e. the syndrome is non-zero), the error correction processor 112 then executes computations to perform error correction of the block data, based on the error pattern represented by the syndrome, the total numbers of lost-byte errors in respective ones of the counters 102a, 102b, ... 102h, and stored error positions, by successively reading out the stored data symbols from the buffer memory 100 and writing corrected symbol values back into the memory.

Numeral 103 denotes a set of eight negative-logic AND gates, which selects the one of the counters 102a, 102b, ... 102h that is to receive a DROP-OUT pulse to be counted, in accordance with the code word number of the data symbol that has been inputted at the time of that DROP-OUT pulse. The transfer of the DROP-OUT pulses to the AND gates 103a etc. is controlled by a negative-logic AND gate 104, which receives the MSB line P4 of the lines P0 to P4, and hence inhibits transfer of the DROP-OUT pulses to any one of the counters 102a, 102b, ... 102h when the count in that counter reaches a value of 17 or higher. The 4 lower-significance bits of the five-bit counter outputs, produced on lines P0 to P4 are inputted to an adder circuit 105. In each interval in which one symbol of the playback data is inputted to the input terminals 62 (referred to in the following as an interleave interval, for brevity), the lower-significance bits of the count value that is attained by the corresponding one of the counters 102a, 102b, ... 102h has an offset value added thereto (an 8-bit value produced from a code length latch circuit 111 described hereinafter), together with a fixed 4-bit offset value), to produce an 8-bit value (bits n0 to n7) that is supplied as address bits to the buffer memory 100 when a lost-byte error position value is to be stored therein.

Numeral 107 denotes a decoder, for decoding the lower-significance buffer memory address bits Y0 to Y2 produced from the counter 101, to select one of 8 outputs that corresponds to the interleaving level of the currently inputted symbol (i.e. the code word to which the symbol corresponds), for thereby executing input selection for the counters 102a, 102b, ... 102h. Numeral 108 denotes a 3-way 12-bit selector, for selecting (from three sets of 11-bit address values) the lower-significance 11 address bits for the buffer memory 100. Numeral 110 denotes the sector counter, which generates the 5 higher-significance address bits when the buffer memory 100 is accessed. The sector counter is incremented each time playback of a new sector from the optical recording disk begins, by a control signal supplied from the controller 113. In this embodiment, 2K bytes are allocated to each track sector, and the buffer memory 100 has a 64K byte capacity, enabling the memory to store data for 32 sectors.

Numeral 109 denotes a data selector for selecting either a playback data symbol (8 bits D0 to D7), a count of the total number of lost-byte errors attained by one of the counters 102a, 102b, ... 102h (5 bits, P0 to P4), or a value representing a position of a lost-byte error within a data word (8 bits, X0 to X7), to be transferred as 8 data bits (D0 to D7) to the data lines of the buffer memory 100, and stored therein.

Numeral 111 denotes an 8-bit latch, which has the code length (i.e. number of symbols in a code word) set therein, and this is added to a fixed 4-bit offset value, to provide a suitable offset for successive addresses used for storing the lost-byte error positions and lost-byte error totals for a sector in the buffer memory 100, as described hereinafter.

FIG. 11 is a memory map showing the distribution of playback data symbols etc. stored in the buffer memory 100. In general, data of a plurality of sectors will be required to be read from the optical recording disk, in any disk data read operation. The memory region extending between addresses 0000H and 0800H (in hexadecimal notation) is utilized for a first block of data, i.e. from a first one of these sectors, the region between addresses 0800H to F800H for the succeeding data block, and so on. The message data, control data and CRC (i.e. the symbol array D0 to C15 shown in FIG. 9) of the first data block are stored in addresses 0000H to 040FH. The parity symbols (P0 to P127 in FIG. 10) are stored in addresses 0410H to 048FH. The error syndrome (16 bytes for each code word) is stored at addresses 0490H to 050FH. The totals of lost-byte errors for respectively code words are stored in addresses 0510H to 0517H. The respective lost-byte error positions for the code words are stored in addresses 0518H to 0597H.

The operation of this first embodiment will be described referring to the playback signal format shown in FIG. 10, the block diagrams of FIGS. 1 and 3, and the memory map of FIG. 11. Each time a data symbol occurs in that signal, the demodulation section 52 transfers the symbol (as an 8-bit byte) to the deinterleaving and error correction section 56 over lines 55, and supplies a DATA INPUT pulse over line 54, whereby the counter 101 is incremented. The resultant symbol count value attained by the counter 101 is expressed by the 3-bit outputs Y0 to Y2 (representing the interleave level of the symbol, i.e. the number of the corresponding Reed-Solomon code word) and the 8-bit outputs X0 to X7 (representing the position of the symbol within that code word). These bits Y0 to Y2 and X0 to X7 are applied as a set of 11 address bits to the address selector 108, and are transferred (in response to a control signal from the controller 113) therethrough to the address lines of the buffer memory 100. In addition, the symbol byte is transferred through the data selector 109 (in response to a control signal from the controller 113) to the data lines of the buffer memory 100. The controller 113 then issues a write command to the buffer memory 100, whereby that symbol is stored in the memory. The above process is successively executed to store all of the information data, control data, and CRC for one sector in the addresses 0000H to 040FH of the buffer memory 100.

While the above processing is being executed, if drop-out of the playback signal has occurred during a time interval corresponding to a playback data symbol, then in synchronism with a DATA INPUT pulse for that symbol being supplied to the OR gate 114, a DROP OUT pulse will be applied (from the demodulation section 52) to the AND gate 106. This indicates that the symbol byte that is inputted at that time is in error, i.e. is a lost-byte error. The corresponding one of the counters 102a, 102b, ... 102h (selected by an output signal from the decoder circuit 107 applied to the corresponding one of AND gates 103a to 103h) is thereby incremented by one. Specifically, the counter 103a counts lost-byte errors occurring in the code word that extends from D0 to P15 in FIG. 9, counter 103b counts errors in the code word extending from D1 to P31, and so on. Each time a DATA INPUT pulse is inputted from the demodulation section 52, together with a playback symbol, the 3 bits Y0 to Y2 from the counter 101 specify the code word to which the symbol belongs, and the decoder circuit 107 thereby enables an appropriate one of the gates 103a to 103h for selecting the appropriate one of the counters 102a, 102b, ... 102h which is to receive the DROP OUT pulse. This pulse is transferred through the gate 104 and the one of gates 103a to 103h, so that the appropriate one of the counters 102a, 102b, ... 102h is incremented.

At the same time, the four lower-significance bits (P0 to P3) of the count value thus attained by that one of the counters 102a, 102b, ... 102h is added to the offset value produced from the code length latch circuit 111, and also to a fixed offset value, to obtain an 8-bit address value. This is combined with the bits Y0 to Y2 from the counter 101 to obtain an 11-bit address value, which is transferred through the address selector 108 (under the control of command signals applied from the controller 113) to be applied as the address bits AD0 to AD10 for the buffer memory 100. At this time, the bits X0 to X7 from the counter 101 (which represent the position within a code word of the most recently supplied data symbol, as described above) are transferred as an 8-bit data value through the data selector 109 (under the control of command signals applied from the controller 113), to the data lines of the buffer memory 100. That data value is thereby stored in the buffer memory 100 at an address which is determined by the count value of the corresponding one of the counters 102a, 102b, . . . 102h and by the code word to which that data value corresponds (specified by bits Y0 to Y2 from the counter 101).

In this way, each time a DROP-OUT pulse is supplied to the NAND gate 106 to indicate a symbol error, the symbol count value for the corresponding code word is incremented (i.e. the corresponding one of the counters 102a, 102b, . . . 102h is incremented) while in addition the position of the error symbol within the corresponding code word is stored in the buffer memory 100.

When all of the symbols of a sector data block have been supplied and processed as described above, the error correction processor 112 reads out the stored data symbols from the buffer memory 100 and computes an error syndrome, then stores the syndrome in the buffer memory 100. If the syndrome indicates the presence of errors, then the error correction processor 112 executes error correction processing based on the contents of the syndrome, the total numbers of error symbols obtained for each of the code words, and the respective positions of these error symbols within the code words, by reading out the stored data symbols from the buffer memory 100, performing error correction computations, and storing corrected symbols back in the buffer memory 100.

Since the positions of error symbols are utilized in this error correction processing, a greater maximum number of error symbols can be corrected in each code word than is possible with a system in which such position data is not available, so that more effective error correction processing can be achieved.

Figure 4:
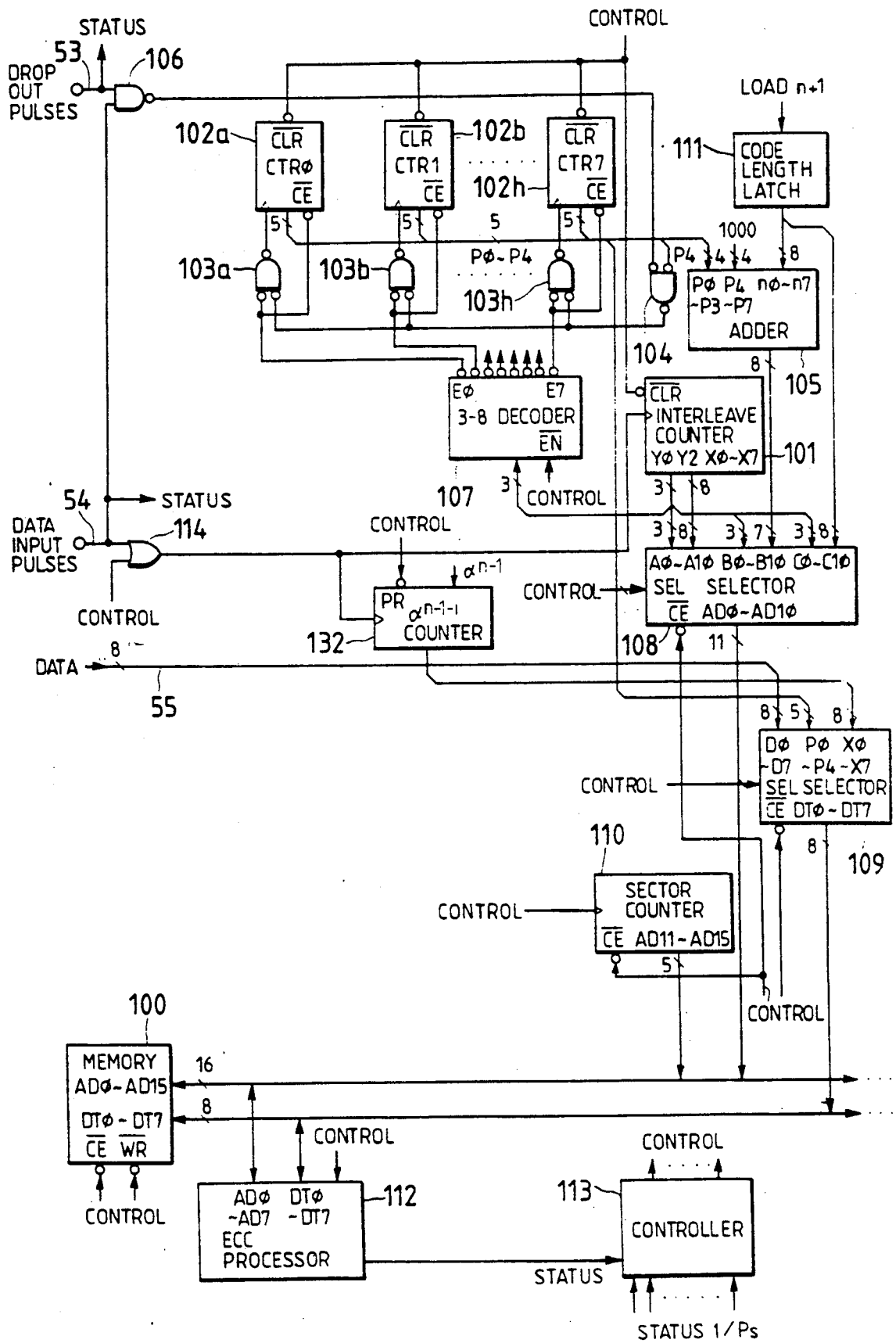

A second embodiment of a deinterleaving and error correction system according to the present invention will be described referring to FIG. 4. This is basically similar to the first embodiment described above. The second embodiment differs however in that, instead of storing position data for each error symbol which represents the position of that symbol within a specific code word, a corresponding Galois field element, (in this embodiment, an 8-bit value representing a specific element in a Galois field), is stored for each error symbol. The simplest method of generating successive Galois field elements is to utilize a linear feedback shift register, as is described in the literature relating to cyclic error correction code techniques. Counting down from a specific initial value, i.e. obtaining successively decremented Galois field elements, can be achieved by arranging a linear feedback shift register for backward shifting (i.e. shifting the shift register contents towards the LSB end, on successive clock pulses) and presetting that initial value in the linear feedback shift register. Numeral 132 denotes a Galois field element counter configured as a linear feedback register circuit which is arranged for such backward shifting, to produce successive shifting of bits out of the low-order end of the register and thereby generating Galois field elements of successively lower order as the contents of the shift register on each successive clock pulse, beginning from a preset value. The preset value utilized is $(n-1)$, where n is the code length of a data block, i.e. the number of symbols in a code word, so that the initial Galois field element is $\alpha^{(n-1)}$. The DATA INPUT pulses are applied as a clock signal to the linear feedback shift register, so that Galois field elements $\alpha^{(n-2)}$, $\alpha^{(n-2)}$ . . . $\alpha^{(n-1-i)}$. . . will be generated as 8-bit outputs from the counter 132 on successive DATA INPUT pulses. That is to say, each time a data symbol is inputted on lines 55, i.e. a DATA INPUT pulse is inputted to the linear feedback register 132, the register contents are multiplied by $\alpha^{-1}$, to obtain a new Galois field element as the new register contents. If a DATA INPUT pulse coincides with the input of a DROP-OUT pulse, then that Galois field element value is transferred through the data selector 109 to be stored in the buffer memory 100. Each such storage operation is at an address which is determined by the output bits Y0 to Y2 and X0 to X7 from the interleave counter 101, so that each Galois field element is stored in a specific one of 8 sets of addresses, in accordance with the code word containing the corresponding error symbol (i.e. the set of memory positions X0,0 to to X0,15, the set X1,0 to X1,15 and so on, shown in FIG. 11).

Since with this embodiment, Galois field element positions for respective error symbols are available in the buffer memory 100 when error correction processing is executed by the error correction processor 112, the computations necessary for error correction processing are simplified.

With the first two embodiments of the invention described above, an improvement is obtained in the maximum number of errors that can be corrected in the playback data of a sector, by storing the lost-byte error positions as described. However if bit slip occurs within a frame of the sector playback data, (i.e. as a result of drop-out of the playback signal producing a temporary disturbance of the frequency of the PLL circuit which produces the clock signal used for converting the playback signal from 2-7 RLLC to normal binary code), then all of the symbol positions from the start of occurrence of the bit slip condition until the succeeding resynchronizing signal burst, will contain errors. That is, the string of errors will continue after the drop-out condition has ended. It will be apparent that errors which are not accompanied by DROP-OUT pulses (supplied to the first two embodiments as described hereinabove) will not be detected by either of these embodiments. Thus, bit slip errors resulting from drop-out, which occur after the drop-out condition has ended (and continue until the succeeding resynchronizing burst), will not be detected by these embodiments.

Two embodiments will now be described which are each based on a second method of error correction processing according to the present invention, which is an extension of the first method of the first two embodiments described above, to enable detection of the positions within a data block of errors resulting from bit slip. With the first two embodiments, an improvement is obtained over the prior art in the maximum number of errors that can be corrected in a sector data block, by storing the positions of respective bytes which are known to be missing, and which therefore represent error positions. With the third embodiment, the positions of bit slip error symbols are also stored for use in error correction, so that improved overall errror correction performance is obtained by comparison with the first two embodiments.

Figure 5:
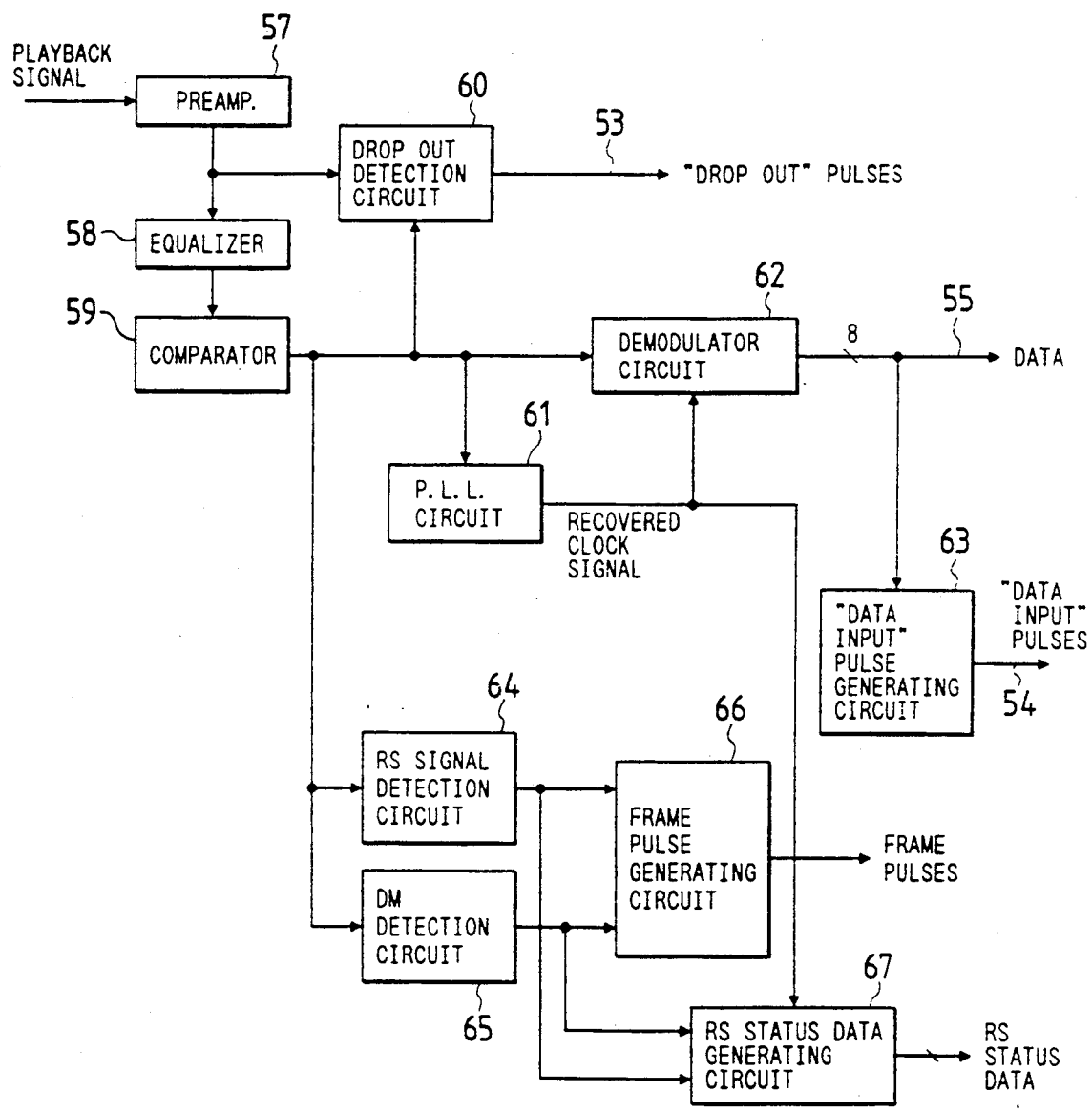
FIG. 5 is a is a general block diagram of a demodulation section of a playback system in third and fourth embodiments of the present invention.

FIG. 5 is a general block diagram of the demodulation section 52 for second and third embodiments of the invention, which overcome the above problem. This differs from the diagram of FIG. 2 in that an RS signal detection circuit 64 serves to detect each pattern of bits in the playback signal (after being produced as a bi-level 2-7 RLLC signal from the comparator circuit 59) which consitutes an RS signal portion, and generates a pulse at the end of that RS signal portion, i.e. produces an RS detection signal. A DM detection circuit 65 detects the data mark at the start of a sector data block, and produces a corresponding output signal. This is combined with the output from the RS signal detection circuit 64 by a frame pulse generating circuit 66 to obtain a frame pulse signal, in which a pulse occurs immediately prior to the first bit of each frame of the sector data. In addition, a RS status data generating circuit 67 serves to count the pulses of the recovered clock signal from the PLL 61 during each frame (e.g. from a count of zero at the start of each frame), to thereby generate a predicted RS signal pulse at the end of the frame. Normally, the time-axis position of this pulse should coincide with that of the RS detection signal pulse at the start of the succeeding frame. However if bit slip has occurred, then the predicted RS signal pulse will be delayed or advanced in phase relative to the RS detection signal pulse. The RS status data generating circuit 67 executes phase comparison of the detected RS signal and predicted RS signal (within a window interval which is of slightly greater duration than an RS detection signal pulse) to derive data (e.g. as a 2-bit code value) at the end of each frame, referred to as RS status data, which indicates whether or not bit slip has actually occurred during that frame.

Figure 6:
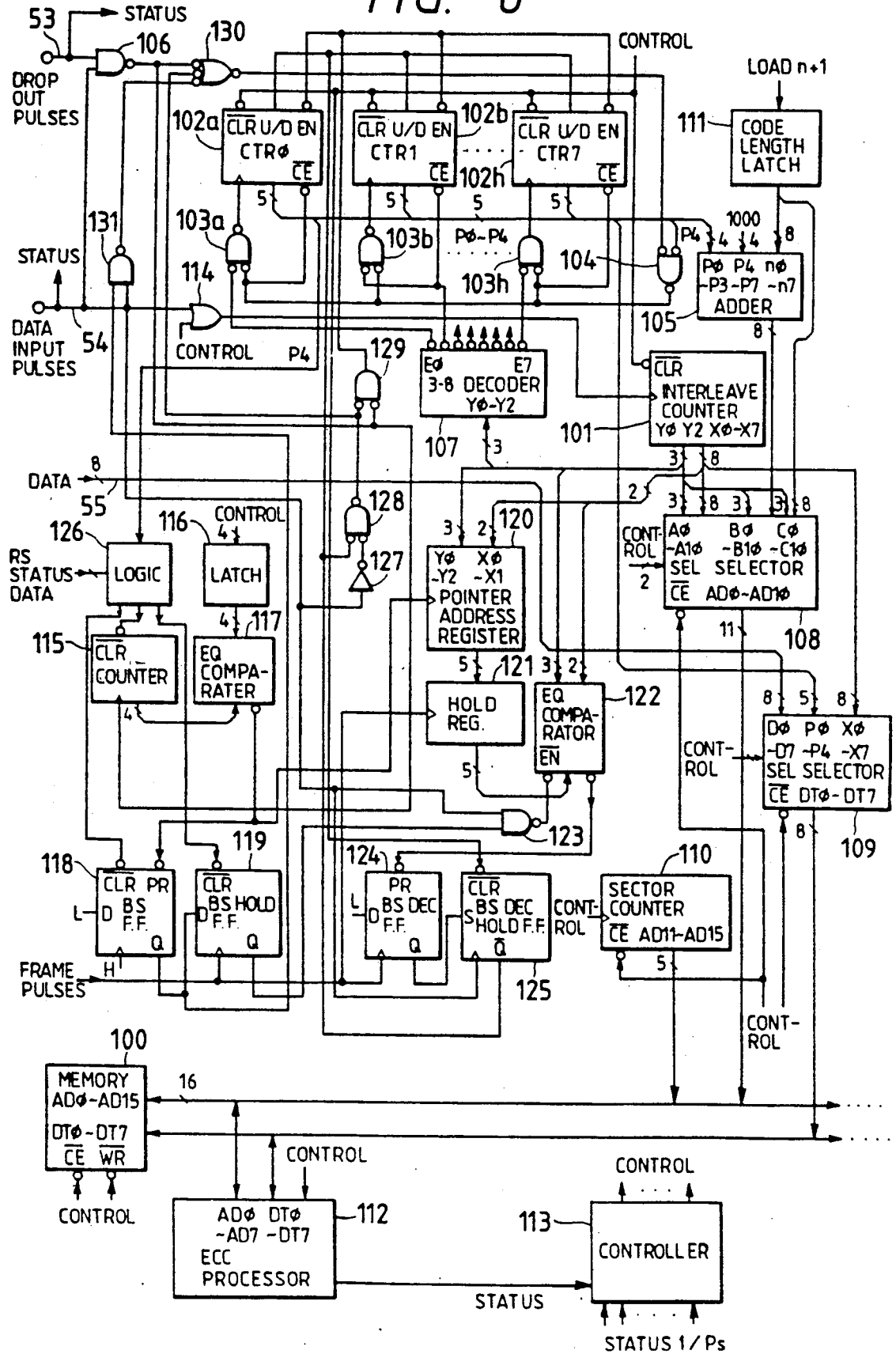
FIGS. 6 and 7 are system block diagrams of third and fourth embodiments of a deinterleaving and error correction system according to the present invention.

FIG. 6 is a block diagram of a third embodiment of a deinterleaving and error correction system according to the invention, for implementing a second method of operation, whereby positions of bit slip errors in the error correction code words of the playback data can be detected and stored as mentioned above, in addition to the positions of lost-byte errors. Circuit blocks in FIG. 6 having identical functions to blocks in the preceding embodiments are indicated by corresponding reference nums, and detailed description of these will be omitted. With this embodiment, as with the first embodiment, a DROP-OUT pulse is supplied to an AND gate 106 in sync with input of each symbol which is a lost-byte error. Also as for the first embodiments, a DATA INPUT pulse is applied to an OR gate 114 in sync with input of each symbol. However as described above, with this embodiment, the demodulation section 52 of FIG. 1 also detects each of the RS resynchronizing signal bursts in the playback signal and produces an RS detection pulse at the end of of each resynchronizing signal burst. These RS detection pulses are supplied to a logic circuit 126.

Numeral 115 denotes a counter circuit for counting the number of DROP-OUT pulses that occur during each frame. A latch 116 holds a value representing a predetermined number of DROP-OUT pulses. A comparator 117 compares that value with the count value of the counter 115, and when these coincide, a coincidence signal is produced from the comparator 117. The value set in the latch 116 is predetermined as representing a minimum number of DROP-OUT pulses occurring in one frame that will result in a probability of bit slip occurring during the remainder of the frame. A FF 118 responds to a coincidence output signal being produced from the comparator circuit 117 by producing an H level output as a "flag", which continues until the end of the frame in which the coincidence signal occurred. Generation of the flag within a frame thus indicates that bit slip has possibly occurred. When the next frame pulse occurs (i.e. at the end of the frame in which FF 118 is set, but prior to resetting of FF 118), a FF 119 is set by the flag output from the FF 118, to produce an H level output during the frame which succeeds the one in which FF 118 was set. The FF 118 is then reset by an output signal from the logic circuit 126. A 5-bit register 120 serves to temporarily hold the position, within the frame concerned, of the data symbol at which bit slip is judged to have occurred. That position is specified by the bits Y0 to Y2 and X0, X1 of the symbol count value from the interleave counter 101. As will be clear from FIG. 9, a symbol position within a frame can be expressed as a code word position (expressed by the bits Y0 to Y2 from the interleave counter 101) and one of two possible positions within that word (expressed by the bits X0 and X1). These output bits from the interleave counter 101 are latched into the register 120 when the coincidence signal is produced from the comparator circuit 117. Another 5-bit register 121 holds the value that has thus been set into the register 120, for the duration of the frame that succeed the frame in which the coincidence signal was generated from the comparator circuit 117. A comparator circuit 122 serves to compare the position value held in the register 121 with successive symbol position values (i.e. represented by the aforementioned bits Y0 to Y2 and X0, X1 from the interleave counter 01) generated during the frame succeeding that in which the coincidence signal was produced from the comparator circuit 117. When the position of a currently inputted symbol within that succeeding frame matches that held in the register 121, a coincidence output is produced from the comparator circuit 122. Numeral 123 denotes a NAND gate whose output is applied to an ENABLE input terminal of the comparator circuit 122. Numerals 124 and 125 denote respective FFs. The FF 124 is set by the coincidence output from the comparator circuit 122, to produce an H state output, and the FF 125 is set by the output from the FF 125 when the next data symbol occurs. When FF 125 is thus set, an output signal produced from that FF is applied to the UP/DOWN control terminals of each of the counters of the set of second counters counters 102a, 102b, . . . 102h, each of which is a reversible counter in this embodiment, causing each of these to enter a down-counting mode of operation.

The logic circuit 126 generates "clear" signals for clearing the counter 115 and resetting the FFs 118 and 119, at times which are determined by the resynchronizing status data that is supplied thereto, which is inputted at the start of each frame. When the count value in any of the counters 102a, 102b, . . . 102h reaches 16 or more, (i.e. the maximum number of errors that can be corrected in a code word) the most significant bit P4 of the count value of that counter goes to the H level. That bit is supplied to the logic circuit 126 as shown, which responds by applying a reset signal to the FF 118. Numeral 127 denotes an inverter, and 128 is a negative-logic AND gate. If at the end of a frame in which bit slip is judged to have occurred (indicated by a coincidence output from the comparator circuit 117 as described above), it is found from the resynchronizing status data that bit slip actually did not occur, then successive decrementing of the counters 102a, 102b, . . . 102h is executed by DATA INPUT pulses transferred through the NAND gate 131 (which is enabled by the H level output from the FF 118) and then through the negative logic OR gate 130. If however, at the end of a frame in which bit slip is judged to have occurred, it is indicated by the resynchronizing status data that bit slip actually did occur, then at that time a "clear" signal is produced from the logic circuit 126, which resets the FF 119. The NAND gate 131 is thereby inhibited, so that no decrementing of the counters 102a, 102b, . . . 102h occurs. Numeral 129 denotes a NOR gate, which functions to inhibit decrementing of the counters 102a, 102b, . . . . 102h (by the output thereof going to the H level) when the output from negative-logic AND gate 128 is active, while in addition a DROP-OUT pulse is being inputted. In this way, any DROP-OUT pulse that occurs during that decrementing operation will, have the same effect as if the pulse were applied to increment the count in the counters 102a, 102b, . . . . 102h.

Figure 12:
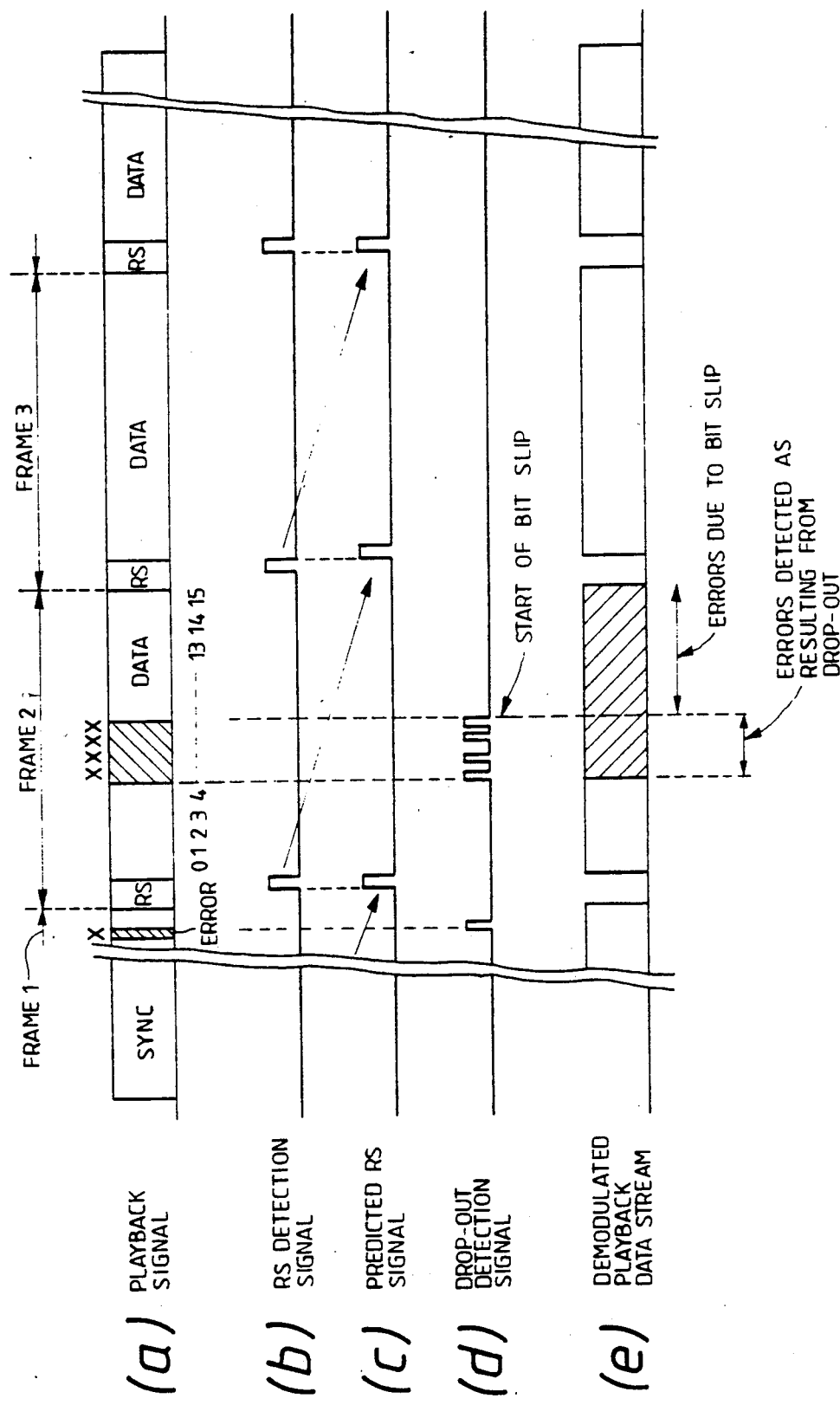
FIG. 12 is a diagram for assistance in describing resynchronizing and bit slip conditions of playback data obtained from a recording disk.

The above operation will be described referring to FIG. 12, in which (a) shows a data block of the playback signal obtained from an optical disk, with a burst of drop-out errors having occurred in the second frame of the block, which caused bit slip. FIG. 12(b) shows the detection signal (hereinafter referred to as the RS detection signal) that is obtained by detecting the resynchronizing signal portions contained in the playback signal. FIG. 12(c) shows a predicted RS signal, which indicates predicted time-axis positions for the RS detection signal. The predicted RS signal is generated within the RS status data generating circuit 67 of FIG. 5, based on counting pulses of the recovered clock signal produced from the PLL circuit 61, beginning from the start of each frame. In normal operation (i.e. without bit slip) the time axis position at which each predicted RS signal occurs should coincide with that of a RS detection signal. For example although drop-out results in a symbol error during frame 1 in FIG. 12, the frequency of the recovered clock signal is not disturbed, so that the RS detection signal and predicted RS signal periods at that end of frame 1 are in coincidence. If however bit slip has occurred during a frame (e.g. the second frame in this example), then the frequency of the recovered clock signal will be disturbed, causing the time axis position of the predicted RS signal of that frame to differ from position of the actual RS detection signal which occurs at the end of that frame.

FIG. 12(d) shows the drop-out detection signal. If for example the level of the playback signal should fall below a predetermined value which is determined as the limit for achieving reliable demodulation, or if a sequence of bits in the playback signal is found to violate a predetermined code standard for these bits (e.g. the 2-7 RLLC standards), then detection of such a condition is used to generate the signal of FIG. 12(d) by the drop-out detection circuit 60 in FIG. 5. FIG. 12(e) shows demodulated data, and illustrates how a continuous burst of error symbols is produced from the point in a frame at which bit slip begins until the end of the frame (when the PLL 61 is resynchronized by the next RS signal pattern). With the embodiment of FIG. 6, when the total number of lost-byte errors that occur within one frame reaches a predetermined value (stored in the latch 117), then it is judged that bit slip has started (at the position in the data stream where that predetermined number of errors is reached) and that a continuous burst of error symbols will therefore occur from that position until the end of the frame. This generation of a burst of error symbols is due to the fact that the number of recovered clock signal periods produced from the PLL during a time interval in which bit slip occurs will be greater than or less than the correct number of pulses, so that accurate demodulation of the playback signal will not be achieved.

In the prior art it has not been possible to detect bit slip errors, using a simple circuit configuration, and the first two embodiments of the present invention described above cannot detect such errors, although they provide substantially improved performance with respect to bit slip, since the overall error correction capability for each sector is substantially improved over the prior art. However with the third embodiment of the present invention, a condition indicating that bit slip may have occurred within a frame of a data block is detected, during that frame, based on the number of lost-byte errors that have occurred in the frame. Thereafter, until the end of that frame, each successive data symbol is identified as an error symbol, with the total count of error symbols being thereby incremented and with the positions of these error symbols within the data block being stored in the buffer memory. At the end of that frame, if it is found that the time axis positions of the predicted RS signal and the RS detection signal differ by more than a specific amount, which indicates that bit slip actually did occur, then no further action is taken. However if it is found that the predicted RS signal and RS detection signals coincide, so that bit slip in fact did not occur, then the aforementioned total error count value is decremented during the succeeding frame, by the number of assumed bit slip error symbols that has been stored for the preceding frame. More specifically, the respective total numbers of errors for the error correction code words are successively decremented in accordance with successive bit slip error symbols. Since the error symbol counters also function as address counters for storing the error symbol positions, the unnecessary error position data which have been stored in the buffer memory 100 during the preceding frame are thereby automatically discarded, if no bit slip actually occurred during that preceding frame.

During each frame in which no bit slip condition is detected, the operation of this embodiment is identical to that of the embodiment of FIG. 3, with each of the counters 102a, 102b, . . . . . 102h being held in an "up-count" mode of operation. It can be understood that although this embodiment enables error symbols resulting from bit slip, as well as lost-byte errors, to be detected and corrected, the maximum number of error symbols that can be corrected in a data block is unchanged from that of the first two embodiments.

Figure 7:
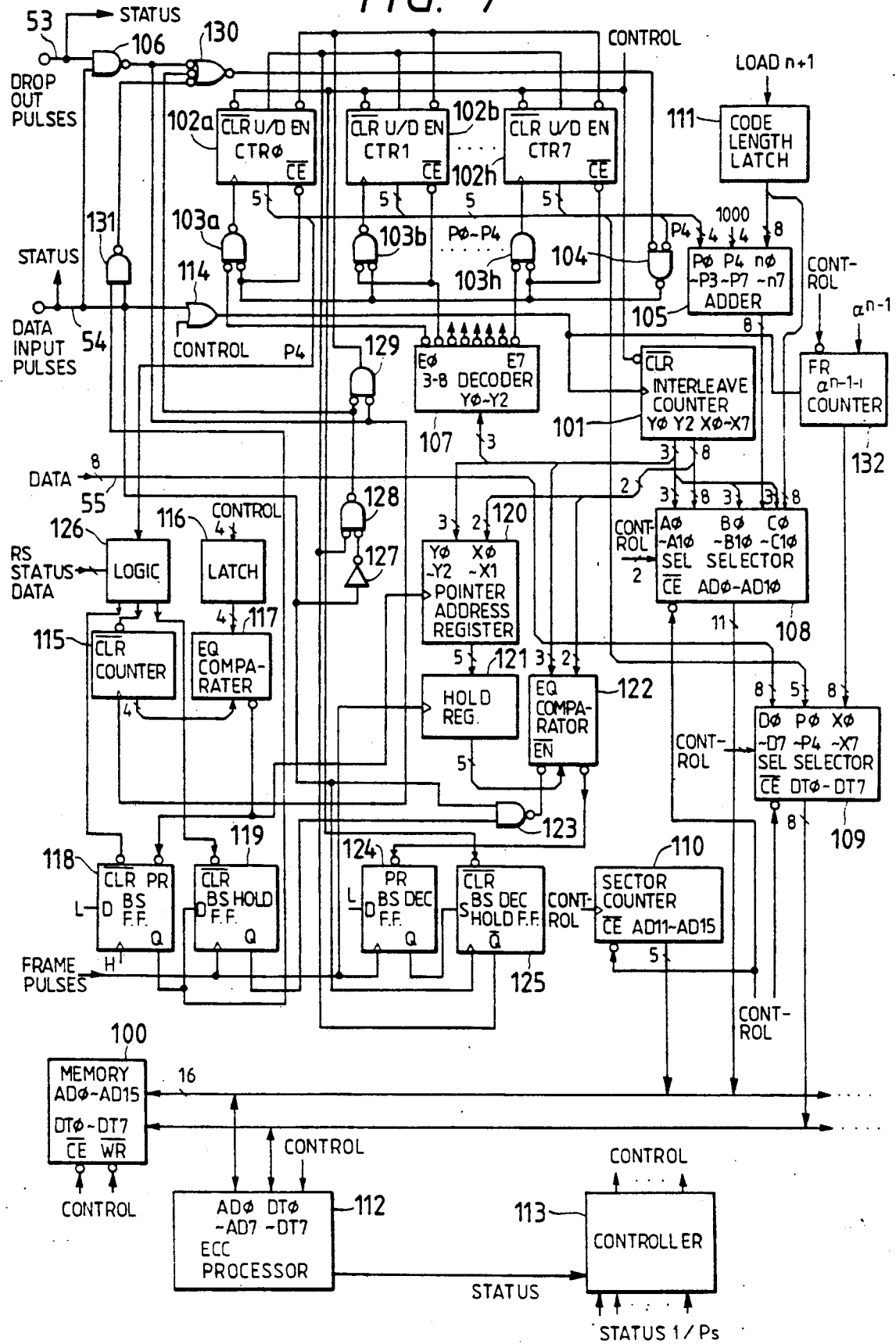

FIG. 7 shows a fourth embodiment of a deinterleaving and error correction system according to the present invention. This is similar to the third embodiment described above, and differs only in that a linear feedback register 132 counts down on successive DATA INPUT pulses, for producing successive Galois field elements, which are stored in the buffer memory 100 in correspondence with respective error symbols, as for the second embodiment described above.

A Reed-Solomon error correction code employing interleaving can enable 100% correction of error symbols in a received block of code data, if the total number of errors within the block does not exceed a certain maximum value (determined by the number of parity bytes used in the block). With playback of data from an optical recording disk, the number of occurrences of drop-out errors, and hence bit slip errors within the data of one sector may result in the correction capabilities of the error correction code being exceeded, i.e. as a result of dust particles on the disk surface, etc. A fifth embodiment of the invention will be described whereby, if the correction capabilities of the error correction code are exceeded, so that irrecoverable errors remain after error correction processing of the playback data of a sector has been completed, then the data of that sector are examined to find occurrences of bit slip. For each frame that is found to contain bit slip errors, the error portion of the frame is re-modulated (i.e. converted back to 2-7 RLLC form) and the resultant data is then shifted in phase by a specific number of bits, in a direction that is determined in accordance with whether the bit slip resulted from an excessively high or excessively low number of clock pulses within the frame in question, and in accordance with the actual number of excess or insufficient clock pulses. These bits are then again modulated (converted back from 2-7 RLLC to normal binary code form), and stored back in the buffer memory as corrected data to replace the bit slip error portion of the frame in question.

It should be noted that this re-modulation and subsequent modulation to execute bit slip correction processing is necessary, since if the error symbol data were to be directly phase-shifted without re-modulation, correction of bit slip errors would not in fact be achieved.

Such a process may not necessarily provide 100% correction of bit slip errors, However a sufficient reduction of bit slip errors can to achieved, such that all of the remaining errors in the sector data can then be corrected, by again executing correction processing based on the error correction code. In this way, irrecoverable errors can be substantially entirely eliminated, even when drop-out error bursts are frequent in the playback signal.

Figure 8:
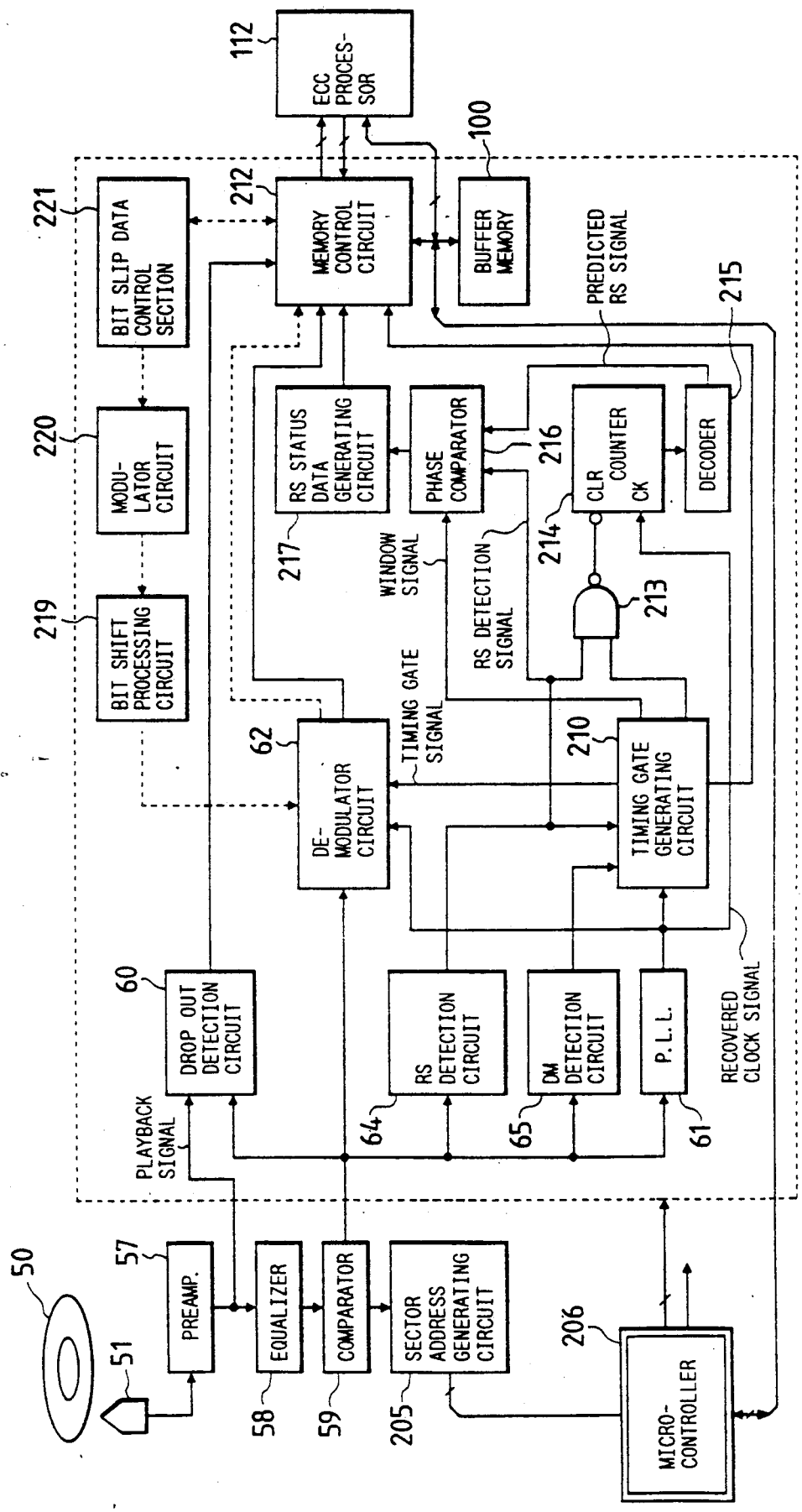
FIG. 8 is a system block diagram of a fifth embodiment of a deinterleaving and error correction system according to the present invention.

FIG. 8 is a general block system diagram of the fifth embodiment. Components and block which are identical to components and blocks in the preceding embodiments are indicated by corresponding reference numerals. As described previously, data read by scanning an optical recording disk 50 are transferred through a preamplifier 57, and converted to a bi-level signal by a comparator 59. It will be assumed in the following description that data have been recorded in 2-7 RLLC form, i.e. that the playback output signal from the comparator 59 is a 2-7 RLLC signal, however it should be noted that the embodiment is not limited to such a form of recording. This playback signal from the comparator 59 is converted to a binary code signal by a demodulator circuit 62, which operates from a recovered clock signal that is derived by a PLL circuit 61. A RS detection circuit 64, DM detection circuit 65 and the PLL circuit 61 correspond to those described hereinabove with reference to FIG. 5.

Figure 10:
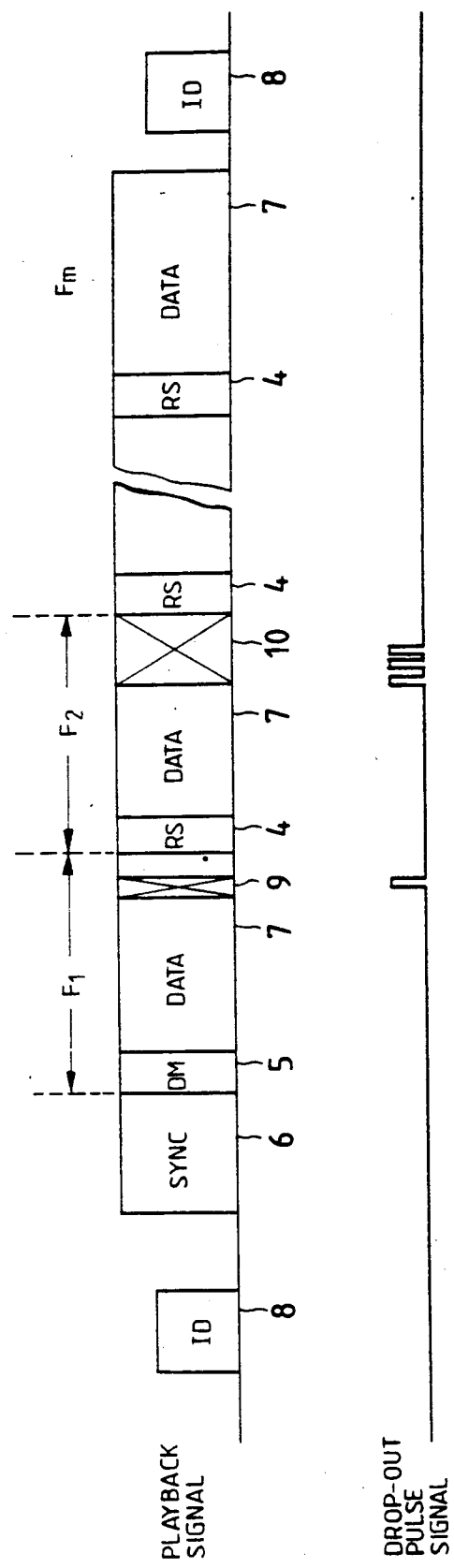
FIG. 10 shows an example of a format of a bi-level playback signal, corresponding to one sector of a recording disk track.

Numeral 205 denotes a sector address generating circuit, which detects sector addresses contained in the playback signal, i.e. numbers indicating respective sectors, based on the sector ID portion which precedes each sector data block as shown in FIG. 10. The sector addresses are supplied to a microcontroller 206, which issues command signals for controlling the overall operation of the system. The microcontroller 206 is a special type of high-speed programmed microprocessor, which is commercially available in integrated circuit form for use in such applications.

As for the preceding embodiments, drop-out of the playback signal is detected by a drop-out detection circuit 60, which generates a drop-out pulse in synchronism with each playback data symbol which coincides with a drop-out condition. Successive symbols of the playback data, ouputted from the demodulator circuit 62, are stored in a region of a buffer memory 100, while (based on the output from the drop-out detection circuit 60) data are stored in the buffer memory 100 which indicate the positions in the sector data block at which drop-out occurred, i.e. which indicate the symbols in the stored playback data which are lost-byte errors as a result of drop-out. In this embodiment, each such error position is expressed as a symbol position within a specific frame of the playback data.

A memory control circuit 212 controls all read and write operations of the buffer memory 100, under the control of commands from the microcontroller 206. A error correction processor 112 executes error correction of the data of each sector, after all of the sector data have been stored in the buffer memory 100. A timing gate generating circuit 210 receives the recovered clock signal produced from the PLL circuit 61, together with the DM detection signal from the DM detection circuit 65 and the RS detection signal from the RS detection circuit 64, and generates various gate and timing signals based on these inputs. The recovered clock signal is also supplied to a counter 214, which is reset at the start of each frame of the playback signal by an output signal from a NAND gate 213, based on the RS detection signal and a gate signal from the timing gate generating circuit 210. The count state in the counter 214 is decoded by a decoder 215 to produce a predicted RS signal pulse at the end of each frame of the playback signal. As described for the preceding embodiments, such a predicted RS signal pulse (derived by counting recovered clock signal pulses during a frame) should ideally coincide with the RS detection signal pulse that is generated at the start of the succeeding frame, if bit slip did not occur during the frame. The RS detection signal and predicted RS signal are supplied to a phase comparator circuit 216, to be compared in phase, with the comparison being executed within an interval defined by a window signal (produced from the timing gate generating circuit 210), of duration slightly greater than the RS detection signal and predicted RS signal pulse widths. A signal is thereby supplied to a RS status data generating circuit 217 at the end of each frame of the playback signal, which indicates whether bit slip occurred during that frame, and the direction of the bit slip. The RS status data generating circuit 217 responds by generating RS status data which indicate the bit slip status for that frame, i.e. indicating whether bit slip occurred, the direction of the bit slip, and the magnitude of the bit slip (specifically, the time difference between the RS detection signal pulse and predicted RS signal pulse that are produced at the end of that frame, expressed as a number of bits). During reading of data from the optical recording disk 50, as successive symbols are stored in the buffer memory 100, the RS status data obtained for successive frames are also stored in the buffer memory 100.

Circuit paths which are utilized during bit slip error correction processing, described hereinafter, are indicated in broken-line form. A bit slip data control section 221 is utilized to control this bit slip error correction processing. A modulator circuit 220 executes re-modulation of error data resulting from bit slip, during this correction processing, i.e. executes re-conversion of data from binary code to 2–7 RLLC form. A bit slip processing circuit 219 performs phase shifting of the re-modulated data, in a direction and by an amount as required to correct the bit slip.

The operation of this embodiment will be described referring first to FIG. 12. FIG. 12(a) shows the playback signal produced from the preamplifier 57, FIG. 12(b) shows the RS detection signal, FIG. 12(c) shows the predicted RS signal, FIG. 12(d) shows the drop-out detection signal from the drop-out detection circuit 60, and FIG. 12(e) shows the demodulated playback data obtained from the demodulator circuit 62. Three successive frames are shown in FIG. 12, from the start of a block of sector data. Drop-out is shown as occurring briefly in frame 1, resulting in a brief-duration error in the playback signal, but without bit slip errors being produced in the demodulation data. However in frame 2, a burst of drop-out errors occurs in the playback signal, with corresponding error symbols occurring in the demodulation playback data of FIG. 12(e). In this case, the number of successive drop-out errors in the playback signal is sufficient to disturb the frequency of the PLL circuit 61 (with this condition occurring at some point during the drop-out error burst) whereby all of the symbols of the playback data, from the end of the drop-out burst until the end of frame 2, are in error due to bit slip. The PLL circuit 61 is then resynchronized by the RS signal portion at the start of frame 3.

Figure 13:
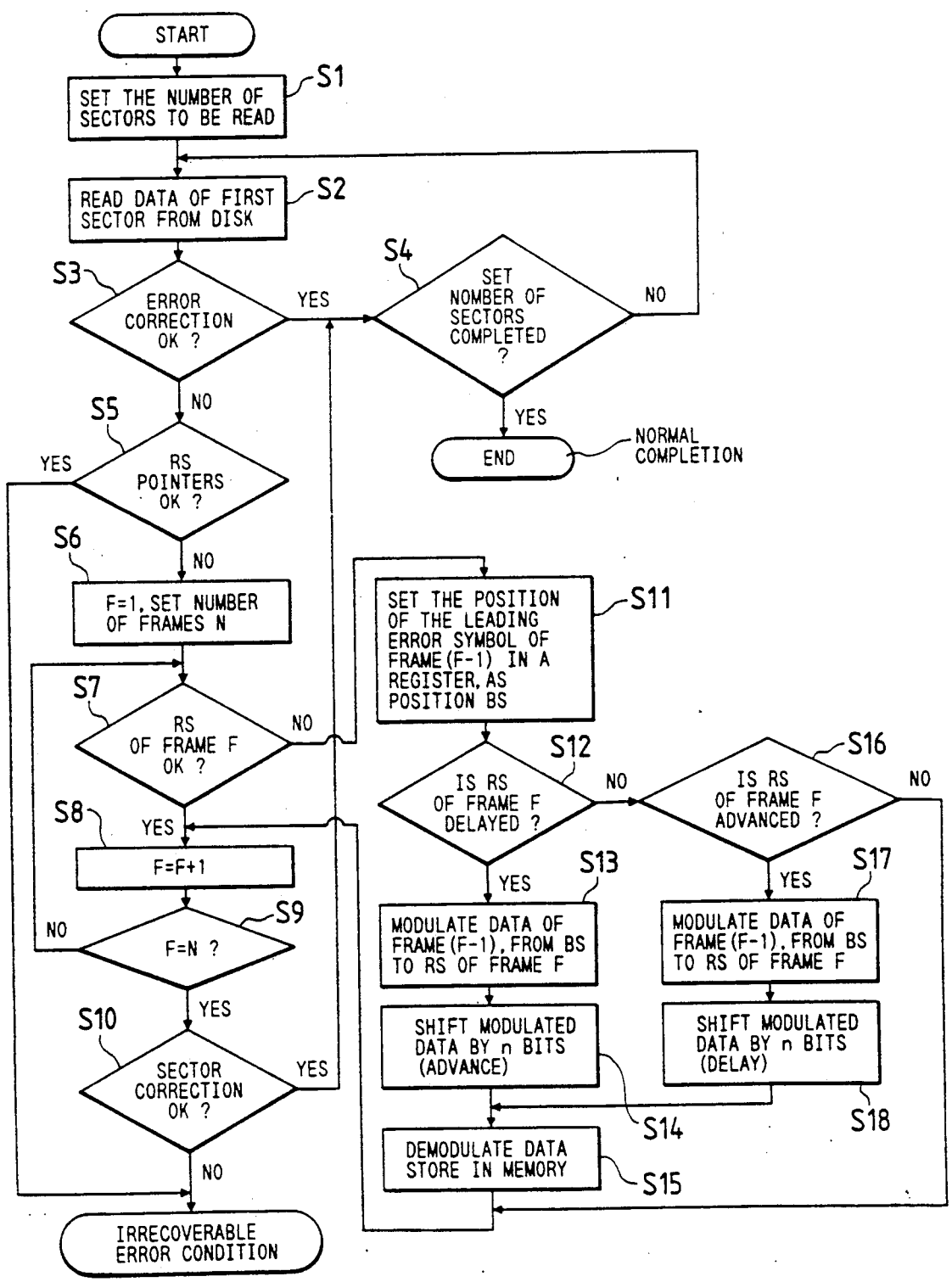
FIG. 13 is a flow chart of data playback operation for the fifth embodiment, including bit slip recovery operation.
Figure 14:
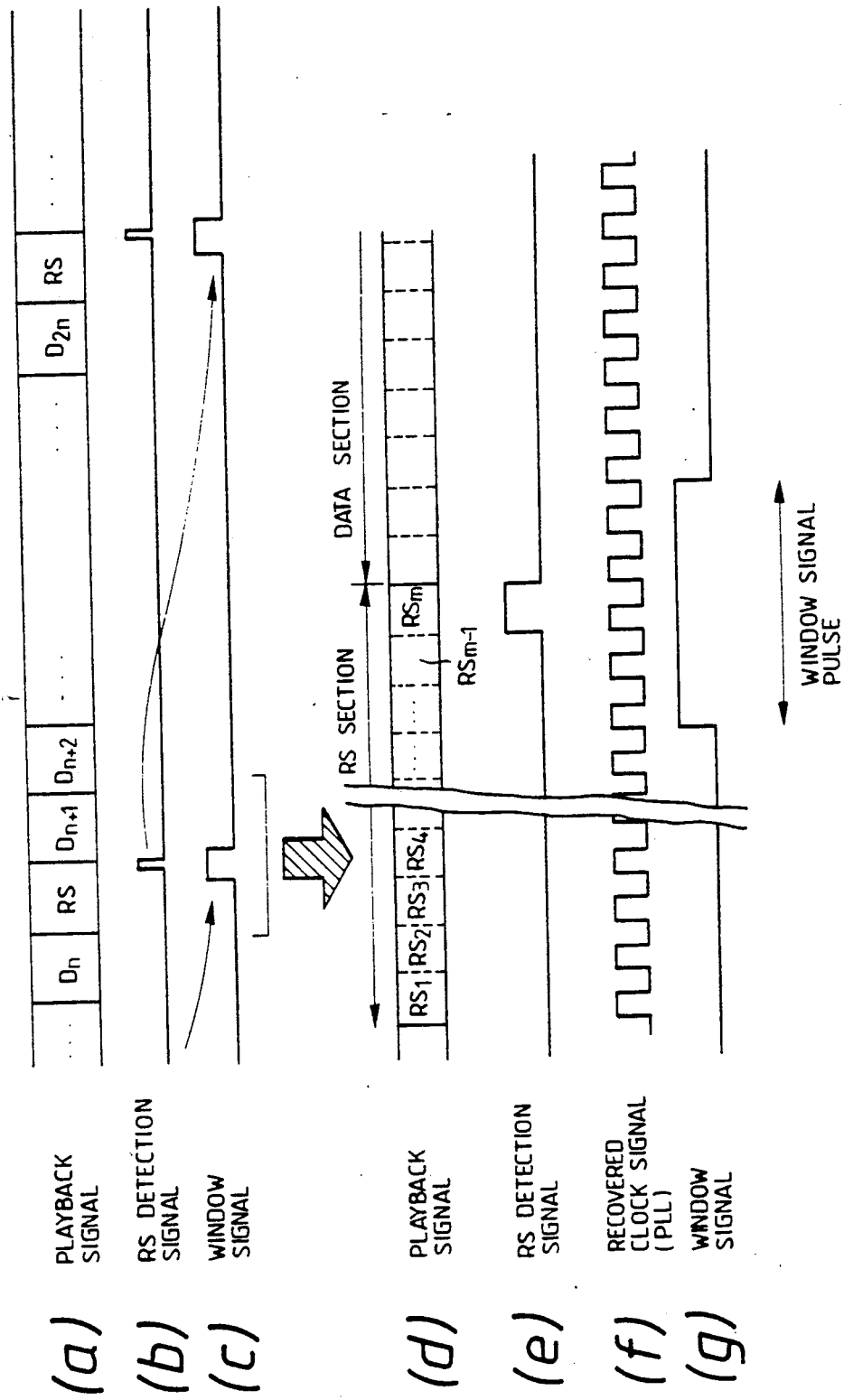
FIG. 14 is a timing diagram for describing the operation of the fifth embodiment of FIG. 8, showing a window signal.
Figure 15:
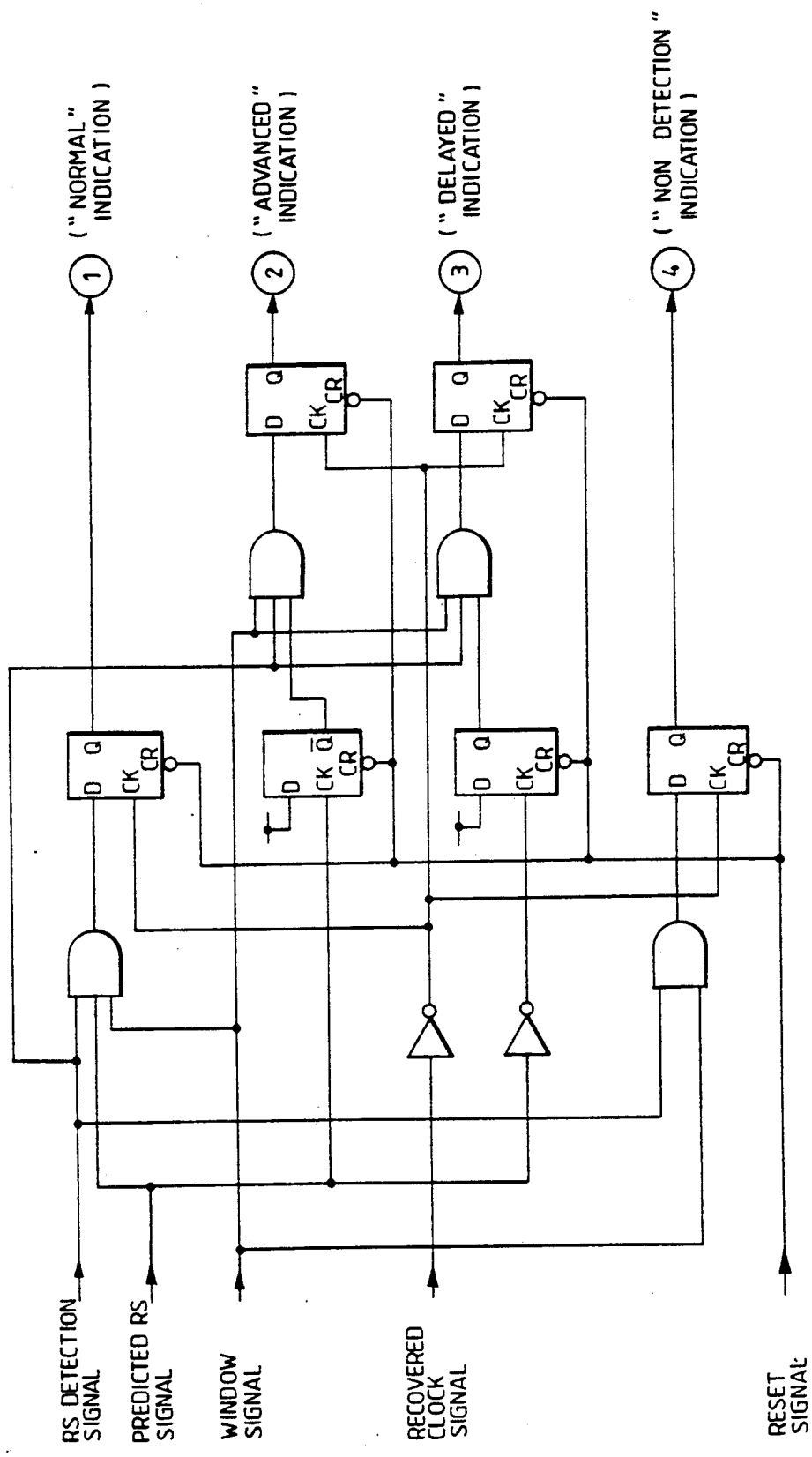
FIG. 15 is a circuit diagram of a resynchronizing signal detection circuit.
Figure 16:
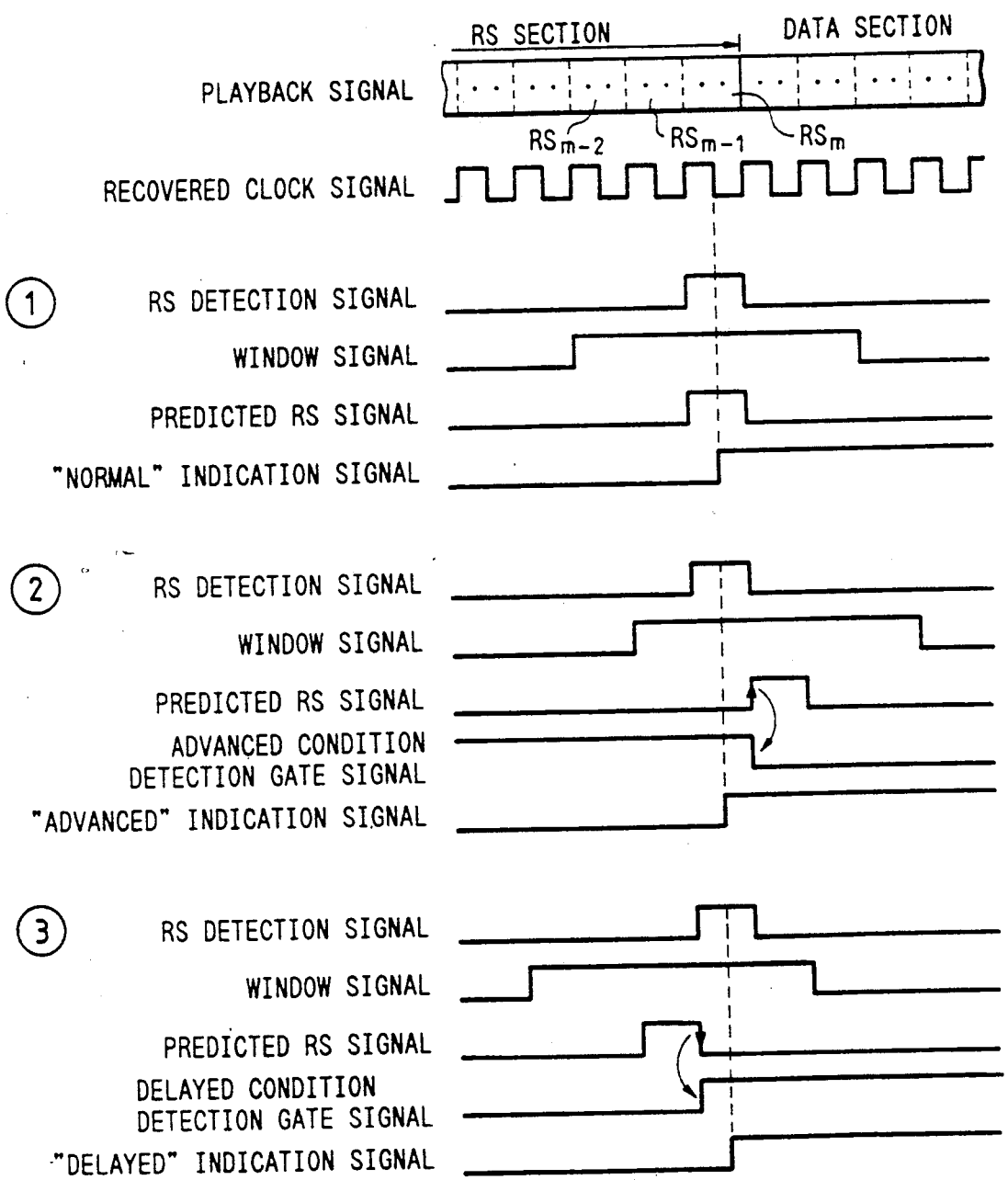
FIG. 16 is a timing diagram for further describing the operation of the fifth embodiment of FIG. 8.

The operations whereby the overall operation of the syste is controlled, (basically by commands generated from the microcontroller 206), will be described referring to the flow chart of FIG. 13. Firstly, when data from a number of sectors are to be read from the optical recording disk 50, the respective sector addresses are set into a register (not shown in the drawings) as step S1. Scanning of the disk 50 then begins, and when the address of the first of the required sectors is encountered and supplied from the sector address generating circuit 205, reading of the sector data from the disk begins (step S2). Successive symbols of that data are thereby outputted from the demodulator circuit 62 and stored in the buffer memory 100. In addition, when any output pulses are produced from the drop-out detection circuit 60, indicating lost-byte errors in the playback data, the positions in the sector data at which these lost-byte errors occur are stored in the buffer memory 100. In addition, at the end of each frame of the playback data, the RS status data for that frame, generated from the RS status data generating circuit 217, are stored in the buffer memory 100.

When all of the data of that first sector have been stored in the buffer memory 100, error correction processing is executed by the error correction processor 112. Upon completion of this error correction processing, if it is found that all errors have been corrected by the error correction processing, then a decision is made as to whether all the required sectors have been read from the disk (step S4). If however the error correction processor 112 detects that irrecoverable errors remain in the sector data (i.e. a NO decision in step S3), then the RS status data which have been stored in the buffer memory 100 are successively read out from the memory and checked, to find if the status data indicate that bit slip occurred in any frame (step S5) If no indication of bit slip is obtained, then since no reduction of the number of errors in the sector can be achieved by bit slip correction processing, system operations are halted in an "irrecoverable error" condition.

If it is found that bit slip has occurred in a frame of the sector data, however, then the microcontroller 206 is notified of this, and responds by generating commands for executing bit slip correction processing. A count value F, representing the frame number, is then set to 1, and the total number of frames in the sector is set as a value N in a register. (step 6). The RS status data for successive frames are then checked (the loop S7, S8, S9). During that checking, if it is found that the RS detection signal pulse at the start of the current frame F did not coincide with the the predicted RS signal derived during frame (F-1), then this indicates that bit slip occurred during frame (F-1). The data which have been stored in the buffer memory 100, representing the positions of lost-byte errors in frame (F-1), are then read out from the memory. The position of the first lost-byte error in the frame (F-1) is then obtained, and stored in a register, as a position (referred to in the following as the BS position) indicating the occurrence of bit slip within that frame, in step S11. Thus with this embodiment, bit slip is assumed to occur at the position where the first of a burst of error symbols occurs in the frame. The term "position within a frame" in this case indicates a symbol number within the frame, e.g. one of the 16 numbers 0, 1, 2, . . . . . 15 of frame 2 in FIG. 12(a).

If it is found (step S12) that the RS detection signal pulse at the start of frame F was delayed with respect to the corresponding predicted RS signal pulse, then operation proceeds to step S13, in which the set of symbols of frame (F-1) extending from the BS position to the end of that frame are read out from the buffer memory 100, and transferred by the bit slip data control section 221 to the modulator circuit 220. At this time, successive bits of that set of symbols are transferred to the modulator circuit 220 in synchronism with a system clock signal (not shown in the drawings). This system clock signal is also supplied to the modulator circuit 220 and the demodulator circuit 62 (in place of the output from PLL 61), for executing re-modulation and demodulation (i.e. 2–7 RLLC reconversion and 2–7 RLLC-to-binary code conversion) respectively. The resultant output 2–7 RLLC signal from the modulator circuit 220 is then advanced in phase (step S14) by being transferred through the bit slip processing circuit 219, with the amount of phase advance being a number of bits that is determined by the amount of bit slip that is to be corrected, as specified by the contents of the RS status data as described hereinabove.

A similar process, with phase shifting in the opposite direction, is executed (steps S17, S18) if it is found that phase delay is necessary.

The resultant phase-shifted 2–7 RLLC signal produced from the bit slip processing circuit 219 is then demodulated (i.e. converted back to normal binary code form) by the demodulator circuit 62, and the resultant set of corrected data symbols are stored in the buffer memory 100 (step S15) to replace the error portion of frame F, for example to replace the hatched-line portion of the data of frame 2 shown in FIG. 12(e). In this way, a substantial degree of correction of bit slip errors in frame F is achieved, thereby increasing the probability that complete error correction can be achieved by subsequent error correction processing based on the Reed-Solomon code words, by the error correction processor 112. The above process is executed for each of the frames in which bit slip has been detected. When all of the frames of the sector data have been checked, and processed for bit slip correction where necessary, then operation proceeds to step S10, in which error correction processing of the stored sector data is executed by the error correction processor 112. If the error correction processor 112 judges that errors remain in the sector data after this error correction processing has been completed, then operation is halted as an "irrecoverable error" condition. If the error correction processor 112 judges that all errors have been corrected, then reading of the next required sector from the disk is begun.

In the data signal format of FIG. 10 described hereinabove, no RS signal portion is provided at the end of the final frame of a sector data block. If it is considered necessary to detect bit slip in the final frame, with the third, fourth or fifth embodiments of the invention, then this can be enabled by providing an additional RS signal portion at the end of the final frame of the sector data, so that a predicted RS signal pulse can be generated at the end of the final frame and compared with a final RS detection signal pulse to obtain RS status data for the final frame.

To execute the bit slip error correction processing of the fifth embodiment described above, it is necessary to provide time for reading stored data from the buffer memory 100, subsequently writing data back into the memory, and repeating error correction processing by the error correction processor 112. However normally, since the bit slip error correction processing is executed only if it is found that irrecoverable errors remain after initial error correction processing has been executed based on the interleaved code words of the sector data, such bit slip error correction processing will have negligible effect upon the overall speed of processing a number of sectors in succession.

Furthermore with the fifth embodiment, as for the preceding embodiments, error position data representing the position within the sector data of each lost-byte error (detected based on drop-out of the playback signal) are stored in the buffer memory 100. These error position data are utilized during error correction processing by the error correction processor 112, and it can be shown that use of such error position data enables an improvement to be obtained in error correction capability that is equivalent to increasing the Hamming distance of the Reed-Solomon code by a factor of two. Improving the error correction capability by providing such error position information is more advantageous, in many ways, than attempting to obtain an improvement by increasing the number of parity bytes assigned to each data block.

Although the above embodiments have been separately described, it will be apparent that the basic principles of the various embodiments could be combined in various ways. For example the bit slip error correction system used in the fifth embodiment could be added to any of the preceding embodiments, to obtain an increase in the error correction capability.

What is claimed is:

1. In an apparatus for recovering data symbols from an input data signal, including demodulation means for demodulating said input data signal to obtain said data symbols, a system for deinterleaving and error correction of a fixed number of data symbols of a block of data formed as a plurality of interleaved error correction code words, the system comprising:
   memory means;
   means for storing sets of said symbols produced from said demodulation means as respective code words in an array of addresses of said memory means corresponding to a predetermined error correction code array format;
   means for detecting signal quality deterioration conditions of said input data signal which indicate occurrences of error symbols;
   means for counting numbers of said error symbols occurring in respective ones of said code words, to obtain respective error symbol count values;
   means for storing in said memory means at addresses determined by said error symbol count values, as error position data, respective addresses in said memory means of error symbols which coincide with detection of said signal quality deterioration condition;
   means functioning after a final one of said fixed number of data symbols has been obtained from said demodulation means for writing final ones of said error symbol count values into predetermined addresses of said memory means; and
   error correction means functioning after said final error symbol count values have been written int he memory means for operating on said data symbols, error position data, and error symbol count values, to execute error correction processing.

2. In an apparatus for recovering data symbols from an input data signal, including demodulation means for demodulating said input data signal to obtain said data symbols, a system for interleaving and error correction of a fixed number of data symbols of a block of data formed as a plurality of interleaved error correction code words, the system comprising:
   memory means;
   means for storing sets of said symbols produced from said demodulation means as respective code words in an array of addresses of said memory means corresponding to a predetermined error correction code array format;
   means for detecting signal quality deterioration conditions of said input data signal which indicate occurrences of error symbols;
   means for counting respective total members of said error symbols, to obtain symbol count values for respective ones of said code words;
   means for generating numeric values representing successive Galois field elements, in response to successive ones of said symbols obtained from said demodulation means;
   means for storing in said memory means at addresses determined by said error symbol count values, as error position data, respective ones of said Galois field elements which are generated in coincidence with detection of said signal quality deterioration condition;
   means functioning after a final one of said fixed number of data symbols has been supplied, for writing final ones of said error symbol count values into predetermined addresses of said memory means; and
   error correction means functioning after said final error symbol count values have been written in the memory means for operating on said data symbols, error position data, and error symbol count values, to execute error correction processing.

3. In an apparatus for recovering data symbols from an input data signal, including means for deriving a recovered clock signal from said input data signal and demodulation means utilizing said recovered clock signal for demodulating said input data signal to obtain said data symbols, a system for deinterleaving and error correction of data symbols of a block of data formed as a plurality of interleaved error correction code words, said block being divided into a plurality of successive frames each comprising an identical number of data symbols, each of the frames being preceded by a fixed-duration resynchronizing signal, the system comprising:

memory means;

detection means responsive to each of said resynchronizing signals for generating a corresponding resynchronizing detection signal;

means for storing sets of said symbols produced from said demodulation means as respective code words in an array of addresses of said memory means corresponding to a predetermined error correction code array format;

means for detecting a signal quality deterioration condition of said input data signal which indicates occurrence of a symbol error and for producing a dropout pulse in synchronism with each of said data symbols which coincides with said condition;

reversible counter means for counting successive ones of said drop-out pulses to produce respective error symbol count values corresponding to said code words;

means responsive to generation of a predetermined number of said drop-out pulses during an $n^{th}$ one of said frames for generating a signal indicating that a bit slip condition has possibly occurred within said $n^{th}$ frame, at a specific position within the frame, and for designating all symbols of said $n^{th}$ frame which are obtained subsequent to said specific position as being error symbols;

means for storing in said memory means at addresses determined by said error symbol count values, as error position data, respective addresses in said memory means of said error symbols;

means for detecting an actual occurrence of bit slip during a frame by counting a number of periods of said recovered clock signal which occur between two resynchronization signals which respectively immediately precede and immediately succeed said frame;

means functioning, if said actual occurrence of bit slip is not detected for said $n^{th}$ frame, to execute down-counting by said reversible counter means during an $(n+1)^{th}$ frame immediately succeeding said $n^{th}$ frame, by an amount which is identical to a number of error symbols counted as having occurred due to bit slip during said $n^{th}$ frame;

means functioning after a final one of said fixed number of data symbols has been supplied, for writing final ones of said error symbol count values into predetermined addresses of said memory means; and error correction means functioning after said final error symbol count values have been written in the memory means for operating on said data symbols, error position data, and error symbol count values, to execute error correction processing.

4. In an apparatus for recovering data symbols from an input data signal including demodulation means for demodulating said input data signal to obtain said data symbols, a system for deinterleaving and error correction of data symbols of a block of data formed as a plurality of interleaved error correction code words, the system comprising:

memory means;

first counter means for counting successive ones of said data symbols to produce, for each of said data symbols, a corresponding symbol count value representing a corresponding one of the code words and a position of said each data symbol within the corresponding code word, and means for writing said each data symbol into said memory means at an address of said memory means that is determined by said symbol count value;

means for detecting a signal quality deterioration condition of said input data signal which indicates occurrence of a symbol error and for producing a drop-out pulse in synchronism with each of said data symbols which coincides with said condition;

second counter means comprising a set of counters respectively corresponding to said code words, controlled by said symbol count value from said first counter means for counting successive ones of said drop-out pulses to produce respective error symbol count values corresponding to said code words, and means for writing into said memory means, in response to each of said drop-out pulses, the corresponding symbol count value from the first counter means as an error position value, said corresponding symbol count value being written into an address of said memory means that is determined by a corresponding one of said error symbol count values;

means functioning after a final one of said fixed number of data symbols has been supplied, for writing final ones of said error symbol count values into predetermined addresses of said memory means; and error correction means, functioning after said final error symbol count values have been written in the memory means, for operating on said data symbols, said error position values and said error symbol count values to execute error correction processing.

5. In an apparatus for recovering data symbols from an input data signal, including demodulation means for demodulating said input data signal to obtain said data symbols, a system for deinterleaving and error correction of data symbols of a block of data formed as a plurality of interleaved error correction code words, the system comprising:

memory means;

first counter means for counting successive ones of said data symbols to produce, for each of said data symbols, a corresponding symbol count value representing a corresponding one of the code words and a position of said each data symbol within the corresponding code word, and means for writing said each data symbol into said memory means at an address of said memory means that is determined by said symbol count value;

means for detecting a signal quality deterioration condition of said input data signal which indicates occurrence of a symbol error and for producing a drop-out pulse in synchronism with each of said data symbols which coincides with said condition;

second counter means comprising a set of counters respectively corresponding to said code words, controlled by by said symbol count value from said first counter means for counting successive ones of said drop-out pulses to produce respective error symbol count values corresponding to said code words;

third counter means comprising a linear feedback counter responsive to successive ones of said data symbols for multiplying a count value held therein by a fixed amount, to obtain count values expressing respective positions within a Galois field index region of said data symbols which coincide with said signal quality deterioration condition, and means for writing into said memory means, in response to each of said drop-out pulses, a corresponding count value from the third counter means as an error position value, said corresponding count value being written into an address of said memory means that is determined by a correcpoding one of said error symbol count values;

means functioning after a final one of said fixed number of data symbols has been supplied, for writing final ones of said error symbol count values into predetermined addresses of said memory means; and error correction means, functioning after said final error symbol count values have been written in the memory means, for operating on said data symbols, said error position values and said error symbol count values to execute error correction processing.

6. An apparatus according to claim 5, in which said data block comprises parity data for error correction purposes, and further comprising error correction means for executing error correction based on said parity data, and in which said error correction is executed after all of the symbols of said data block have been stored in said memory means and in which operation of said bit slip processing control means is initiated only if it is found that irrecoverable errors remain after executing said error correcting processing based on the parity data.

7. In an apparatus for recovering data symbols from an input data signal, including means for deriving a recovered clock signal from said input data signal and demodulation means utilizing said recovered clock signal for demodulating said input data signal to obtain said data symbols, a system for deinterleaving and error correction of data symbols of a block of data formed as a plurality of interleaved error correction code words, said block being divided into a plurality of successive frames each comprising an identical number of data symbols, said frames being respectively preceded by fixed-duration resynchronizing signals, the system comprising:

resynchronizing detection means responsive to said resynchronizing signals for generating corresponding resynchronizing detection signals;

resynchronizing prediction means responsive to each of said resynchronizing detection signals for deriving a time of subsequent occurrence of a predicted resynchronizing signal, based on a number of pulses of said recovered clock signal produced during a frame which succeeds said each resynchronizing detection signal;

first comparison means for comparing respective time-axis positions of each of said resynchronizing detection signals and a corresponding predicted resynchronizing signal, and for producing an indication signal if said time-axis positions differ by less than a predetermined amount;

memory means;

first counter means for counting successive ones of said data symbols to produce, for each of said data symbols, a corresponding symbol count value representing a corresponding one of the code words and a position of said each data symbol within the corresponding code word, and means for writing said each data symbol into said memory means at an address of said memory means that is determined by said symbol count value;

means for detecting a signal quality deterioration condition of said input data signal which indicates occurrence of a symbol error and for producing a drop-out pulse in synchronism with each of said data symbols which coincides with said condition;

second counter means comprising a set of reversible counters respectively corresponding to said code words, controlled by said symbol count value from said first counter means for counting successive ones of said drop-out pulses to produce respective error symbol count values corresponding to said code words, and means for writing into said memory means, in response to each of said drop out pulses, a corresponding symbol count value from said second counter means as an error position value, said corresponding symbol count value being written into an address of said memory means that is determined by a corresponding one of said error symbol count values;

third counter means for counting successive ones of said drop-out pulses during each of said frames, beginning from a fixed initial count value at the start of each frame;

means for detecting when a count value in said third counter means exceeds a predetermined error count value, and producing an output signal in response to said detection;

first latch means responsive to said output signal from the count value detection means for producing an output signal which continues until the end of a frame in which said error count value was exceeded;

control means responsive to said first latch means output signal for incrementing said second counter means in response to successive ones of said data symbols;

second latch means for storing a symbol count value from said first counter means corresponding to a symbol position at which said error count value was exceeded;

second comparison means functioning during a frame immediately succeeding said frame in which the error count value was exceeded, for detecting when an error count value of said first counter means coincides with said symbol count value held in said second latch means;

control means responsive to said indication signal from said first comparison means, when coincidence is detected by said second comparison means, for decrementing said second counter means in response to successive ones of said data symbols until the end of said immediately succeeding frame;

means functioning after a final data symbol of said block has been supplied, for writing final ones of said error symbol count values into predetermined addresses of said memory means; and error correction means, functioning after said final error symbol count values have been written in the memory means, for operating on said data symbols, said error position values and said error symbol count values to execute error correction processing.

8. An apparatus for executing demodulation and error correction of a data block supplied as a serial input data signal, the data signal having a format comprising successive frames each comprising a fixed number of data symbols, each frame being preceded by a clock signal resynchronizing signal, the apparatus comprising:

clock signal recovery means for deriving a recovered clock signal from said data signal;

demodulation means responsive to said recovered clock signal for demodulating said data signal to recover successive ones of said data symbols;

memory means for storing said data symbols;

detection means for detecting successive ones of said resynchronizing signals and for generating a resynchronizing detection signal in response to each resynchronizing signal;

means functioning during each frame of said data signal for counting a number of periods of said recovered clock signal which occur during said each frame, to generate a predicted resynchronizing signal during a final part of said each frame, said predicted resynchronizing signal coinciding with a resynchronization detection signal produced at the start of an immediately succeeding frame, during normal functioning of said clock signal recovery means;

means for detecting a signal quality deterioration condition of said data signal, and for generating error position data indicating positions of respective ones of said data symbols which coincide with occurrences of said signal quality deterioration condition, and for storing said error position data in said memory means;

means for deriving resynchronizing signal status data representing an amount and direction of phase difference between the predicted resynchronizing signal of said each frame and the resynchronization detection signal of said immediately succeeding frame, and for storing said resynchronizing signal status data in said memory means; and bit slip processing control means functioning after all of the data symbols and resynchronizing status data for said data block have been stored in said memory means, for reading out said resynchronizing status data to determined whether a bit slip condition has occurred within any of said frames, and, for a frame in which bit slip has occurred, successively:

(a) determining a position within the frame at which the bit slip has occurred, based on said signal quality deterioration data for the frame;

(b) reading out from said memory means a portion of the data of the frame, extending from said position at which bit slip occurred up to the end of the frame;

(c) executing an amount of phase shift of said data portion, in a direction and amount such as to compensate for an amount of bit slip indicated by said resynchronizing status data;

(d) modulating said portion for conversion back to a form in which data are expressed in said data signal;

(e) demodulating said portion to obtain successive data symbols; and (f) storing said symbols in said memory means to replace said data portion of the frame.

9. In an apparatus for recovering data symbols from an input data signal, including means for deriving a recovered clock signal from said input data signal and demodulation means utilizing said recovered clock signal for demodulating said input data signal to obtain said data symbols, a system for deinterleaving and error correction of data symbols of a block of data formed as a plurality of interleaved error correction code words, said block being divided into a plurality of successive frames each comprising an identical number of data symbols, the frames being respectively preceded by fixed-duration resynchronizing signals, the system comprising:

resynchronizing detection means responsive to said resynchronizing signals for generating corresponding resynchronizing detection signals;

resynchronizing prediction means responsive to each of said resynchronizing detection signals for deriving a time of subsequent occurrence of a predicted resynchronizing signal, based on a number of pulses of said recovered clock signal produced during a frame which succeeds said each resynchronizing detection signal;

first comparison means for comparing respective time-axis positions of each of said resynchronizing detection signals and a corresponding predicted resynchronizing signal, and for producing an indication signal if said time-axis positions differ by less than a predetermined amount;

memory means;

first counter means for counting successive ones of said data symbols to produce, for each of said data symbols, a corresponding symbol count value representing a corresponding one of the code words and a position of said each data symbol within the corresponding code word, and means for writing said each data symbol into said memory means at an address of said memory means that is determined by said symbol count value;

means for detecting a signal quality deterioration condition of said input data signal which indicates occurrence of a symbol error and for producing a drop-out pulse in synchronism with each of said data symbols which coincides with said condition;

second counter means comprising a set of reversible counters respectively corresponding to said code words, controlled by said symbol count value from said first counter means for counting successive ones of said drop-out pulses to produce respective error symbol count values corresponding to said code words;

third counter means comprising a linear feedback counter responsive to successive ones of said data symbols for multiplying a count value held therein by a fixed amount, to obtain count values expressing respective positions within a Galois field index region of said data symbols which coincide with said signal quality deterioration condition, and means for writing into said memory means, in response to each of said drop-out pulses, a corresponding count value from the third counter means as an error position value, said corresponding count value being written into an address of said memory means that is determined by a corresponding one of said error symbol count values;

fourth counter means for counting successive ones of said drop-out pulses during each of said frames, beginning from a fixed initial count value at the start of each frame;

means for detecting when a count value in said fourth counter means exceeds a predetermined error count value, and producing an output signal in response to said detection;

first latch means responsive to said output signal from the count value detection means for producing an output signal which continues until the end of a frame in which said error count value was exceeded;

control means responsive to said first latch means output signal for incrementing said second counter means in response to successive ones of said data symbols;

second latch means for storing a symbol count value from said first counter means corresponding to a symbol position at which said error count value was exceeded;

second comparison means functioning during a frame immediately succeeding said frame in which the error count value was exceeded, for detecting when an error count value of said first counter means coincides with said symbol count value held in said second latch means;

control means responsive to said indication signal from said first comparison means, when coincidence is detected by said second comparison means, for decrementing said second counter means in response to successive ones of said data symbols until the end of said immediately succeeding frame;

means functioning after a final data symbol of said block has been supplied, for writing final ones of said error symbol count values into predetermined addresses of said memory means; and error correction means, functioning after said final error symbol count values have been written in the memory means, for operating on said data symbols, said error position values and said error symbol count values, to execute error correction processing.

* * * * *